(12) United States Patent
Ramnani et al.

(10) Patent No.: US 12,175,816 B2
(45) Date of Patent: Dec. 24, 2024

(54) FLEET DATA COLLECTION USING A UNIFIED MODEL TO COLLECT DATA FROM HETEROGENOUS VEHICLES

(71) Applicant: Amazon Technologies, Inc., Seattle, WA (US)

(72) Inventors: Bhushan Ramnani, San Francisco, CA (US); Yohan Martin, Bellevue, WA (US); Florian Johannes Stadler, Berlin (DE); Michael Anthony Aleksiuk, Seattle, WA (US); Ivan Law, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 17/548,392

(22) Filed: Dec. 10, 2021

(65) Prior Publication Data
US 2023/0169805 A1 Jun. 1, 2023

Related U.S. Application Data

(60) Provisional application No. 63/283,964, filed on Nov. 29, 2021.

(51) Int. Cl.
G07C 5/08 (2006.01)
G07C 5/00 (2006.01)
(Continued)

(52) U.S. Cl.
CPC ............. *G07C 5/085* (2013.01); *G07C 5/008* (2013.01); *G07C 5/10* (2013.01); *H04L 69/04* (2013.01); *H04L 67/12* (2013.01)

(58) Field of Classification Search
CPC ............. B60W 30/09; B60W 30/0953; B60W 30/0956; B60W 2520/105;
(Continued)

(56) References Cited

U.S. PATENT DOCUMENTS 5,400,018 A 3/1995 Scholl
7,103,460 B1 9/2006 Breed
(Continued)

FOREIGN PATENT DOCUMENTS

CN 103793787 A 5/2014
CN 110351314 10/2019
(Continued)

OTHER PUBLICATIONS

Jiyong Han, et al., "GS1 Connected Car: An Integrated Vehicle Information Platform and Its Ecosystem for Connected Car Services based on GS1 Standards", 2018 IEEE Intelligent Vehicles Symposium (IV), IEEE, Jun. 26, 2018, pp. 367-374.
(Continued)

*Primary Examiner* — Dale W Hilgendorf
*Assistant Examiner* — Frank T Glenn, III
(74) *Attorney, Agent, or Firm* — Alexander A. Knapp; Kowert, Hood, Munyon, Rankin & Goetzel, P.C.

(57) ABSTRACT

A system comprising one or more computing devices implements a vehicle information extraction service. The vehicle information extraction service enables customers to maintain a model of a fleet of vehicles and collect vehicle information from heterogenous vehicles included in the fleet, wherein the vehicles are configured with different in-vehicle communication configurations. The vehicle information extraction service automatically generates scheme packets for data collection to be sent to the heterogenous vehicles, wherein are formatted in accordance with the different respective in-vehicle communication configurations of the heterogenous vehicles, without the customer of the vehicle information extraction service having to account for these differences.

20 Claims, 16 Drawing Sheets

(51) Int. Cl.
*G07C 5/10* (2006.01)
*H04L 67/12* (2022.01)
*H04L 69/04* (2022.01)

(58) Field of Classification Search
CPC ....... B60W 2540/20; B60W 2554/402; B60W 30/18145; B60W 2554/4029; B60W 2556/45; G08G 1/09; G08G 1/16
See application file for complete search history.

(56) References Cited

U.S. PATENT DOCUMENTS

| | | |
|---|---|---|
| 8,930,402 B1 | 1/2015 | Sing |
| 9,104,537 B1 | 8/2015 | Penilla |
| 9,280,653 B2 | 3/2016 | Forest |
| 9,430,225 B2 | 8/2016 | Ko |
| 9,854,442 B2 | 12/2017 | Mazzara, Jr. |
| 9,984,420 B1 | 5/2018 | Manzella et al. |
| 10,540,892 B1 | 1/2020 | Fields |
| 10,666,767 B1 | 5/2020 | Floyd |
| 10,802,481 B1 | 10/2020 | Menon |
| 11,025,598 B1 | 6/2021 | Laghaelan |
| 11,037,177 B1 | 6/2021 | Chan et al. |
| 11,553,363 B1 | 1/2023 | Chan |
| 11,790,458 B1 | 10/2023 | Menon et al. |
| 2002/0007237 A1* | 1/2002 | Phung ............... G05B 23/0275 709/219 |
| 2003/0009270 A1 | 1/2003 | Breed |
| 2003/0093199 A1* | 5/2003 | Mavreas ............... G07C 5/0808 701/31.4 |
| 2007/0026876 A1 | 2/2007 | Freilich |
| 2008/0080459 A1 | 4/2008 | Kotecha |
| 2009/0171548 A1* | 7/2009 | Hyde .................... F02D 41/021 701/102 |
| 2010/0228404 A1 | 9/2010 | Link, II |
| 2012/0041638 A1 | 2/2012 | Johnson |
| 2013/0275761 A1 | 10/2013 | Catsburg |
| 2014/0059534 A1 | 2/2014 | Daum |
| 2014/0073254 A1 | 3/2014 | Ichihara et al. |
| 2014/0075198 A1 | 3/2014 | Peirce |
| 2014/0079217 A1 | 3/2014 | Bai |
| 2014/0123123 A1 | 5/2014 | Bahls |
| 2014/0195100 A1 | 7/2014 | Lunggsgaard |
| 2014/0228061 A1 | 8/2014 | Draznin |
| 2015/0105933 A1 | 4/2015 | Martin |
| 2015/0180840 A1 | 6/2015 | Jung |
| 2015/0193220 A1 | 7/2015 | Rork |
| 2015/0286475 A1 | 10/2015 | Vangelov |
| 2015/0288636 A1 | 10/2015 | Yalavarty |
| 2015/0301821 A1 | 10/2015 | Danne |
| 2016/0099806 A1 | 4/2016 | Racklyeft et al. |
| 2016/0099927 A1 | 4/2016 | Oz |
| 2016/0140779 A1 | 5/2016 | Takenaka |
| 2016/0196131 A1 | 7/2016 | Searle |
| 2016/0330032 A1 | 11/2016 | Naim et al. |
| 2017/0086054 A1 | 3/2017 | Azevedo |
| 2017/0187787 A1 | 6/2017 | Syamala |
| 2017/0193026 A1 | 7/2017 | Pettovello |
| 2017/0200324 A1 | 7/2017 | Chennakeshu |
| 2017/0242678 A1 | 8/2017 | Sangameswaran |
| 2017/0251339 A1 | 8/2017 | Addepalli |
| 2017/0262274 A1 | 9/2017 | Vangelov |
| 2017/0315797 A1 | 11/2017 | Vangelov |
| 2017/0331795 A1 | 11/2017 | Martin |
| 2017/0358204 A1 | 12/2017 | Modica |
| 2018/0024826 A1 | 1/2018 | Caushi |
| 2018/0048473 A1 | 2/2018 | Miller |
| 2018/0081670 A1 | 3/2018 | Caushi |
| 2018/0088589 A1 | 3/2018 | Hasegawa |
| 2018/0091596 A1 | 3/2018 | Alvarez |
| 2018/0145991 A1 | 5/2018 | McCauley |
| 2018/0189103 A1 | 7/2018 | Teshler |
| 2018/0196656 A1 | 7/2018 | Miller |
| 2018/0196660 A1 | 7/2018 | Rivas Silva |
| 2018/0217828 A1 | 8/2018 | Madrid |
| 2018/0217831 A1 | 8/2018 | Madrid |
| 2018/0310159 A1 | 10/2018 | Katz |
| 2019/0050220 A1 | 2/2019 | Daum |
| 2019/0065933 A1* | 2/2019 | Bogdoll .................... G06N 3/08 |
| 2019/0080528 A1 | 3/2019 | Bednar |
| 2019/0087168 A1 | 3/2019 | Carranza |
| 2019/0088104 A1* | 3/2019 | Crewe .................... G08B 21/22 |
| 2019/0140886 A1* | 5/2019 | Zywicki .................. G01S 19/39 |
| 2019/0146775 A1 | 5/2019 | Wang |
| 2019/0206156 A1* | 7/2019 | Ponda .................... B64D 47/00 |
| 2019/0212348 A9 | 7/2019 | Schwoebel |
| 2019/0258727 A1* | 8/2019 | Schmotzer ............ G06F 40/242 |
| 2019/0259223 A1 | 8/2019 | Sangameswaran |
| 2019/0279440 A1 | 9/2019 | Ricci |
| 2019/0304213 A1 | 10/2019 | Chen |
| 2019/0311556 A1 | 10/2019 | Thron |
| 2019/0391800 A1 | 12/2019 | Lin et al. |
| 2020/0028946 A1 | 1/2020 | Vora |
| 2020/0029209 A1 | 1/2020 | Nolscher |
| 2020/0043063 A1 | 2/2020 | London |
| 2020/0074864 A1* | 3/2020 | McErlean ............. G08G 1/0129 |
| 2020/0089487 A1 | 3/2020 | Ramic et al. |
| 2020/0111272 A1 | 4/2020 | Ferre Fabregas |
| 2020/0114910 A1* | 4/2020 | Han ....................... G08G 1/167 |
| 2020/0162912 A1 | 5/2020 | Schaaf |
| 2020/0198651 A1 | 6/2020 | Levy |
| 2020/0213820 A1 | 7/2020 | Sim |
| 2020/0234249 A1 | 7/2020 | Chamon |
| 2020/0234515 A1 | 7/2020 | Gronsbell |
| 2020/0313873 A1 | 10/2020 | Mondello |
| 2020/0334924 A1 | 10/2020 | Wells |
| 2020/0364953 A1* | 11/2020 | Simoudis ............... G06N 20/00 |
| 2020/0410787 A1 | 12/2020 | Petousis |
| 2021/0012588 A1 | 1/2021 | Kwon |
| 2021/0058814 A1 | 2/2021 | Puranic |
| 2022/0237958 A1 | 7/2022 | Tzamaloukas et al. |
| 2022/0294685 A1 | 9/2022 | Li |
| 2022/0377142 A1 | 11/2022 | Yamamoto |
| 2023/0102153 A1 | 3/2023 | Floyd |
| 2023/0115145 A1 | 4/2023 | Sanchez |
| 2023/0171314 A1 | 6/2023 | Srinivasan et al. |
| 2023/0260336 A1 | 8/2023 | Nishie |

FOREIGN PATENT DOCUMENTS

| | | |
|---|---|---|
| CN | 113590359 A | 11/2021 |
| CN | 114338542 | 4/2022 |
| EP | 2736225 A1 | 5/2014 |
| EP | 3700243 A1 | 8/2020 |
| EP | 3319266 | 1/2021 |
| FR | 3003382 | 9/2014 |
| GB | 2525654 | 11/2015 |
| JP | 2002202895 A | 7/2002 |
| JP | 2007214696 A | 8/2007 |
| JP | 2019160199 A | 9/2019 |
| JP | 2020035014 A | 3/2020 |
| KR | 20170025955 A | 3/2017 |
| WO | 2007092247 A2 | 8/2007 |
| WO | 2012160668 A1 | 11/2012 |
| WO | 2017058724 | 4/2017 |
| WO | 2017217070 | 12/2017 |
| WO | 2018057321 | 3/2018 |
| WO | 2019126707 A1 | 6/2019 |
| WO | 2019213177 | 11/2019 |
| WO | 2020097221 | 5/2020 |
| WO | 2020183954 | 9/2020 |
| WO | 2020191225 | 9/2020 |
| WO | 2022069033 | 7/2022 |

OTHER PUBLICATIONS

International Search Report and Written Opinion mailed Feb. 27, 2023 in International Application No. PCT/US2022/080006, Amazon Technologies, Inc., pp. 1-12.

International Search Report and Written Opinion mailed Mar. 16, 2023 in International Application No. PCT/US2022/080008, Amazon Technologies, Inc., pp. 1-12.

(56) References Cited

OTHER PUBLICATIONS

U.S. Appl. No. 18/544,222, filed Dec. 18, 2023, Assimakis Tzamaloukas, et al.
Lili Zhang et al., "A DRM System Based on PKI", 2010 Fourth International Conference on Genetic and Evolutionary Computing, IEEE, 2010, pp. 522-525.
Mattias Ohrn, "Publice Key Infrastructure Utilisation in Digital Rights Management", KTH Numerical Analysis and Computer Science, 2004, pp. 1-84.
Sayfan, Gigi, "Matering Kubernetes," May 17, 2017, Packt Publishing Ltd., Birmingham UK.
U.S. Appl. No. 16/835,070, filed Mar. 30, 2020, Brett Francis, et al.
U.S. Appl. No. 16/581,571, filed Sep. 24, 2019, Michael Christopher Wenneman, et al.
U.S. Appl. No. 17/164,720, filed Feb. 1, 2021, David Joseph Mifsud, et al.
U.S. Appl. No. 17/160,184, filed Jan. 27, 2021, Assimakis Tzamaloukas, et al.
U.S. Appl. No. 16/453,921, filed Jun. 26, 2019, Marco Argenti, et al.
U.S. Appl. No. 17/537,320, filed Nov. 29, 2021, Raghuram Onti Srinivasan, et al.

\* cited by examiner

FLEET DATA COLLECTION USING A UNIFIED MODEL TO COLLECT DATA FROM HETEROGENOUS VEHICLES

RELATED APPLICATION

This application claims benefit of priority to U.S. Provisional Application Ser. No. 63/283,964, entitled "Fleet Data Collection Using a Unified Model to Collect Data from Heterogenous Vehicles," filed Nov. 29, 2021, and which is incorporated herein by reference in its entirety.

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicle. Some vehicles may include as many as 70 such electronic control units (ECUs) and 20-30 sensor modalities or more. Additionally, modern vehicles increasingly depend on sensors that generate more data than previous vehicles. For example, autonomous, semi-autonomous, or self-driving vehicles may include multiple cameras, radars, LIDAR sensors, audio microphones, etc. Such sensors may generate significant amounts of data, e.g., 5-10 terabytes of data per hour or more. Transmission of such large amounts of data to a separate service for data analysis poses a non-trivial problem.

Additionally, the vehicle information may be in a format that must be decoded or that requires vehicle specific configuration information to access. For example, the format in which the vehicles communicate may be specific to the vehicle manufacturers and may require decoding of different in-vehicle communication formats according to configurations of those manufacturers. Moreover, in a fleet of heterogeneous vehicles that utilize different signal formats, a common manner of collecting data can not be used for the fleet without accounting for the different signal formats and in-vehicle configurations.

Figure 1:
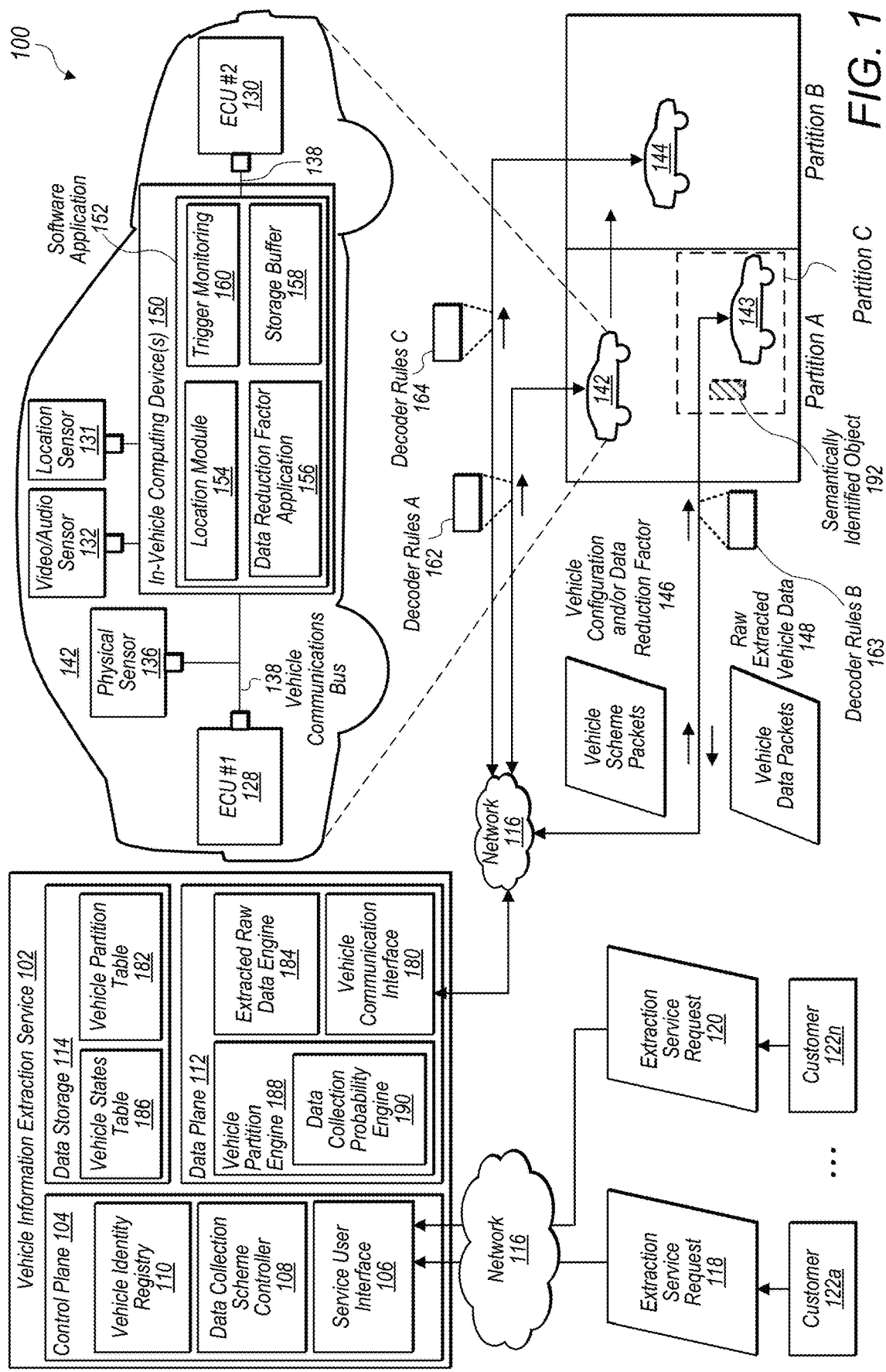
FIG. 1 illustrates a vehicle information extraction service that allows vehicles of differing sensor signal formats to comprise a single fleet of vehicles to be used for data collection and analysis through associating multiple decoder rules for different in-vehicle communication signal configurations with a vehicle model configuration, and/or allows information to be extracted from each of the vehicles based on a partition of the fleet, the number of vehicles in the partition, and inferences about objects in a vehicle's environment determined based on previously collected vehicle information, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle information extraction service and implementing in-vehicle data monitoring and extraction using a software package generated by a vehicle information extraction service. As modern vehicles, such as cars, trucks, motorcycles, etc. become more advanced, they are increasingly equipped with electronic sensors which are utilized for various applications—from increasing fuel efficiency of a vehicle to enhancing greater degrees of automation using artificial intelligence (AI). Vehicles are generating exponentially more data with each new generation of vehicles and are not only beginning to be differentiated between each other mechanically but increasingly differentiated by software. Moreover, the fastest growing trends in automotive industry often involve autonomous vehicle (AV), advanced driver assistance systems (ADAS), and electric vehicle technologies—these technologies all employ a wide array of sensors often generating more than 2 terabytes (TBs) of data per hour. Furthermore, the type of sensors that are increasingly relied upon often produce larger amounts of data. For example, modern vehicles are increasingly relying on multiple high-resolution cameras wherein a single high-resolution camera can generate data at a rate of more than 3,500 Megabits/seconds. Despite advances in wireless technology, such as the fifth generation (5G) technology standard for broadband cellular networks, the bandwidth to transfer the vehicle data poses a significant limitation considering the large number of vehicles that exist each with an increasing number of sensors. Furthermore, the law of diminishing returns often applies to such large collection of data wherein additional bytes of sensor information that are collected may have less value than the prior bytes—in vehicles where there are costly barriers to transport information from a vehicle to a remote service, this diminished value directly translates to waste. However, in order to not only operate but to continue to build and improve vehicle models, vehicle data may need to continue to be collected. Reducing accompanying redundant data however would lower the cost to transport and/or store the collected vehicle data. Because vehicles are not stationary and are often changing location, an optimization of data transfer at a single vehicle edge device may not be sufficient and an optimization at a vehicle fleet level may be required.

Optimization of data collection at the vehicle edge device for a fleet of vehicles may be achieved by considering data collected as not being collected from individual vehicles but rather being collected from a fleet of vehicles as a whole. In the real world, vehicles often move in platoons or waves and interact with many aspects of the environment that are structured and remain the same—this results in sensors from the vehicles (e.g., of a platoon or wave) obtaining data that is often redundant. In some embodiments, a platoon or wave of vehicles may refer to vehicles that share common characteristics. For example, during morning rush hour a set of vehicles traveling in a set of lanes headed in a same direction on a freeway may move together as a platoon of vehicles. As another example, a set of vehicles accelerating from a stopped position in response to a red light changing to green may move together as a wave of vehicles. Many sets of sensor data collected from vehicles when considered as part of a platoon or wave of vehicles may be presumed to be redundant, and in order to avoid redundant data collection a significant amount of this vehicle sensor data may be omitted from being sent to a data processing service. This data reduction may reduce a load placed on the bandwidth of a network used by the vehicles to report collected vehicle information and may reduce the resources required to store and process the sensor data. For example, a platoon or wave of vehicles in or around the same geographic location and time period would each detect with its temperature sensor similar temperatures. The temperature data may be assumed to be redundant and the data extraction service may only require a sub-set of the vehicles of the platoon or wave to transmit the temperature data. This optimization of vehicle data collection may be extended to other types of sensors, such as various ECU sensors, image sensors, etc. In some embodiments, a fleet of vehicles for which data collection is to be applied, may be specified by a customer and may include heterogenous types of vehicles. In some embodiments, a fleet may be defined based on criteria associated with a vehicle, such as "make", "model", etc. In some embodiments, members of a fleet may be adjusted as more makes or models are added or removed from the fleet.

In some embodiments, a geographic location of a vehicle may be determined in a variety of manners. For example, in some embodiments, a global positioning system (GPS) may be used or a global navigation satellite system (GNSS) may be used. Also, in some embodiments, a vehicle may determine or update its location using local sensors and/or algorithms, such as using Computer Vision, LIDAR, vehicle odometry, etc. In some embodiments, the disclosed systems may function properly without requiring a specific positional accuracy. For example, partitions may be formed based on relative positions to other vehicles and objects of interest and will function properly even if actual positional accuracy is not achieved by a system providing vehicle location information.

For example, a platoon or wave of vehicles traveling along a road may encounter many of the same or similar environmental objects which may result in pictures being captured that may be considered to be redundant. Furthermore, any vehicles showing similar mobility patterns or encountering similar environmental factors may be assumed to return a large number of redundant pieces of data. The vehicle information extraction service may use data aggregated from various sources, including images or other information obtained by the fleet of vehicles, in order to make inferences regarding the environment and calculate a likelihood of vehicles in a certain partition of vehicles returning pieces of redundant data. In order to reduce the number of pieces of redundant data returned, a model of a fleet of vehicles may be generated and the density of the vehicles of the fleet of that partition may be obtained to determine a reduction factor. This reduction factor may be communicated to the vehicles using a vehicle scheme packet. The vehicle scheme packet may indicate to a given vehicle the probability with which the given vehicle is to transmit a particular type of sensor data. The reduction factor/probability in which a particular type of sensor data is to be sent may differ between various types of sensors for a given vehicle and/or between different vehicles belonging to different fleets. In some embodiments, a customer of a dynamic data extraction service may desire to collect data from a fleet of vehicles operated or managed by the customer. Also, in some embodiments, the vehicles of the fleet may belong to different partitions, which may in some embodiments, be determined based on platoon-like or wave-like behavior of respective vehicles of the fleet and/or other vehicles of other fleets that are participating in the dynamic data reduction and/or vehicle data extraction service.

A vehicle data extraction service that allows modeling, collecting, and storing data of a fleet of vehicles configured with different in-vehicle communication formats may allow greater flexibility and capabilities for data collection. One problem in extracting vehicle data from a customer fleet arises from different models of vehicles having different in-vehicle communication formats which creates barriers for vehicle data collection, model generation, and analysis. For example, in one vehicle speed information may be available in a vehicle model wherein the vehicle's engine control unit (ECU) is connected via Connected Area Network (CAN) Bus, whereas in another vehicle the speed information may be available in a different model wherein the ECU is connected via Ethernet. In some embodiments, the disclosed vehicle data extraction service that de-couples a vehicle model configuration from an in-vehicle communication signal configuration specific to individual vehicles overcomes this problem.

De-coupling the vehicle model configuration from the in-vehicle communication signal configuration specific to individual vehicles furthermore allows different users to work on different parts of the model independently and allows unified signal representations to be used across a heterogenous fleet of vehicle models. For example, by de-coupling the signal format of the vehicle as represented in a model configuration from the in-vehicle communication signal configuration as represented in decoder rules of respective types of vehicles, a single analytical application may be used regardless of the vehicle model, which may have various decoder rules. "Decoder rules" as used herein comprise any rules involved in the decoding of signals and may be used interchangeably with "decoding rules" and/or "signal decoding rules". Furthermore, a single workflow executed to apply a data collection configuration defining rules for when and how to collect data from the vehicle may be run across a fleet of heterogenous vehicle models in such a service.

FIG. 1 illustrates a vehicle information extraction service that allows vehicles of differing sensor signal formats to comprise a single fleet of vehicles to be used for data collection and analysis through associating multiple decoder rules having different in-vehicle communication signal configurations with a vehicle model configuration, and/or allows information to be extracted from each of the vehicles based on a partition of the fleet, the number of vehicles in the partition, and inferences based on inferences of the vehicle environment, according to some embodiments. The extraction based on partition, vehicle count and/or vehicle environment may allow for dynamic data reduction to be applied to collected data, such that redundant data collection is reduced.

System 100 includes vehicle information extraction service 102 and network 116 that are connected to vehicles 142, 143, and 144. The vehicles 142, 143, and 144 are configured using heterogeneous vehicles signal formats, though they may be included in a single fleet. In some embodiments, network 116 may be connected to any number of vehicles and the heterogeneity of the vehicles of the fleet may arise from the vehicles belonging to differing original equipment manufacturers (OEMs). In other embodiments the vehicles may have a homogeneous vehicle signal format. Customers 122a through 122n are furthermore, connected to vehicle information extraction service via the network 116. In some embodiments, customers 122a through 122n may be vehicle suppliers or vehicle component suppliers (e.g., vehicle original equipment manufacturers (OEMs) and/or tier-1, tier-2, or tier-3 parts suppliers). Network 116 may be a private or public network such as a direct connect connection to a service provider network hosting the vehicle information extraction service 102, or an Internet connection. Network 116 may furthermore be a wireless network, such as a cellular network, Wi-Fi network or other wireless network.

Figure 3:
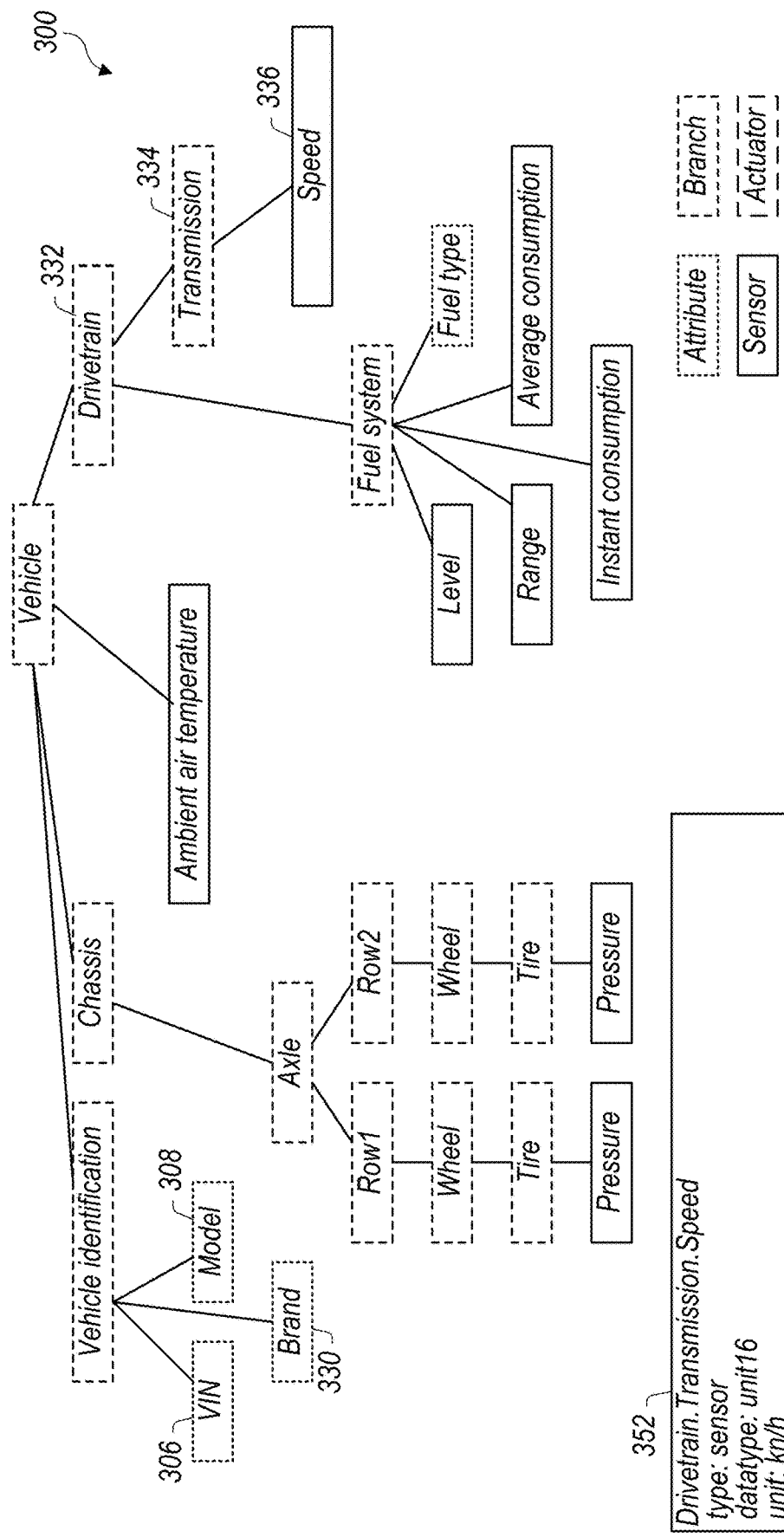
FIG. 3 illustrates a graphical view of an example vehicle model configuration having a hierarchical tree structure that uses a vehicle signal catalog and enables a unified signal representation to be used in collecting data using a common data collection scheme across a fleet of heterogenous vehicle models, according to some embodiments.

In some embodiments, the vehicle information extraction service 102 may include a control plane 104, a data storage 114, and a data plane 112 as further discussed in FIG. 3. The control plane 104 allows customers 122a, 122n to register vehicles, model vehicles, and manage data collection workflows across a single vehicle or a fleet of vehicles. Data plane 112 serves as a processing pipeline for ingestion of raw vehicle data, decoding of the data, and storage and/or retrieval of the vehicle data. In some embodiments the various components of the vehicle information extraction service 102 may be further broken into various subsystems having a decentralized and/or de-coupled format to manage scalability and throughput requirements of the subsystems independently. Data plane 112 may furthermore use configurations such as model configuration and decoder rules of various vehicles maintained by the control plane 104 to decode and enrich extracted vehicle data 148 obtained from the vehicles 142, 143, 144. In some embodiments the vehicle information extraction service 102 and the various subsystems therein may be de-coupled and maintained in different environments to prevent the data plane 112 from overwhelming the control plane 104 with a sudden burst of traffic in events like recovery from an outage or a processing error. The customers 122a, 122n interact with the control plane 104 through extraction service requests 118, 120 to perform vehicle modeling, vehicle sensor testing, vehicle asset registration, vehicle fleet definitions, and data collection scheme management.

In some embodiments, the control plane 104 may include vehicle identity registry 110, data collection scheme controller 108, and service user interface 106 to perform the extraction service requests 118. The service user interface 106 may include a designer canvas and a management console as further discussed in FIG. 4. In some embodiments, customers may provide a dictionary file describing proprietary protocols and encoding formats used to communicate vehicle information over a bus from components designed by the customer (e.g., vehicle supplier and/or vehicle component supplier) and/or an associated proprietary access credential file. For example, customers 122a, 122n may provide extraction service requests 118, 120 comprising decoder rules that are used for decoding raw vehicle data into physical measurements, such as a CAN database (CAN DBC) can be used to decode raw data from CAN bus frames of vehicles into physical signals such as engine speed, radar amplitude etc. In some embodiments, the extraction service requests 118, 120 may contain data collection schemes that define rules for collection of data from vehicles of the fleet. The data collection schemes may indicate extraction criteria (also referred to herein as "data extraction criteria") for vehicle sensor information and define rules that govern data reduction and/or collection optimization through reducing redundant data as further discussed in FIG. 5. Note that the decoder rules and data collection schemes containing extraction criteria are shown in FIG. 1 as being part of a same system. However, in some embodiments, the decoder rules and the data collection scheme may be used separately.

In some embodiments, the vehicle identity registry 110 of the control plane 104 may provide a create, read, update, and delete (CRUD) application programming interfaces (APIs) for managing registry of identities of vehicles in the fleet. The vehicle identity registry 110 may store a key-value record with a vehicle identification (vehicle ID) as the key as and a tuple of vehicle make, vehicle model, and other vehicle attributes as a value such as location, construction date, engine type, fuel type, etc. A vehicle model that is generated using the modeling service may also be associated in a similar tuple format. The vehicle identity registry 110 may facilitate rotation and revocation of vehicle identity certificate as well as facilitate in change of ownership. In other embodiments, the customers 122a, 122n may on-board the vehicles 142, 143, 144 of the fleet using their own certificate authority (CA) and manage the vehicle identity certificate rotation and revocation. In some embodiments, the control plane 104 110 may authenticate certificates signed by the customer's CA. Vehicle identity registry 110 may furthermore facilitate grouping vehicles into fleets based on various criteria as specified by fleet rules given by the customers 122a, 122n. A fleet rule may use any number and/or combination of vehicle attributes to group together a fleet of vehicles. For example, a fleet rule may create a fleet of all vehicles in a certain geographical region such as a city or a state or generate a fleet targeting certain vehicle makes and models. The vehicle identity registry 110 maintains the state of all of the various fleets as vehicles of a fleet are added, removed, or updated.

In some embodiments, the data collection scheme controller 108 may allow customers 122a, 122n to define and manage data collection schemes for a single vehicle or a fleet of vehicles and manage the conditions in which various vehicle data are sent from in-vehicle computing device(s) 150. The data collection scheme controller 108 generates the data collection scheme packets containing vehicle configuration 146 defining the rules that vehicles 142, 143, 144 use to determine when, where, and how to send the various information gathered by their various sensors. The data collection scheme controller 108 then validates the scheme against the model configuration of the vehicle and resolves conflicts across schemes based on customer-defined priorities. If the vehicle scheme is determined to be applied to a fleet, the data collection scheme controller 108 may work with the vehicle communication interface 180 to apply the scheme to designated vehicles of the fleet. In some embodiments, details of the data reduction factor to reduce redundant data may be determined by the customer 122a, 122n and applied to the vehicle scheme using the data collection scheme controller 108. In some embodiments, the data collection scheme controller 108 applies velocity control to safely propagate the scheme across the fleet without errors due to an increased velocity of propagation. Errors may be detected by monitoring health metrics published by the in-vehicle computing device(s) 150 and/or by monitoring active vehicle connections between the vehicles 142, 143, 144 and the vehicle communications interface 180. In some embodiments, a data collection scheme may define customized rules for filtering data (e.g., performing data reduction) on the in-vehicle computing device(s) 150 based on vehicle attributes such as vehicle engine type and other vehicle model parameters/attributes. In some embodiments, vehicle scheme packets may further specify a cadence at which one or more pieces of sensor data is sent (e.g., every 5 minutes), a schedule or duration (e.g., from current time to 20 minutes), and a trigger event (e.g., a threshold brake speed of a vehicle or a departure of the vehicle from a lane). In some embodiments, the trigger event may be a heartbeat and the data propagation may take place continuously at a fixed cadence.

In some embodiments, decoder rules may be sent to the vehicles through the vehicle scheme packets and/or through a separate manifest/configuration. The decoder rules provide parameters necessary for decoding the sensor data such as protocol name, bus standard, (e.g., CAN bus standard), message id for the message within which the sensor is multiplexed, scale, offset, etc.

In some embodiments, the decoder rules may be used by the vehicle information extraction service 102 for decoding the necessary signals at a remote location, such as a cloud-based implementation. In other embodiments, the decoder rules may be applied not in the vehicle information extraction service 102, but rather in the in-vehicle computing device 150 of the vehicle (or other vehicle edge device) to send a decoded signal to the vehicle information extraction service 102. In some embodiments, a desired fleet of vehicles may include heterogeneous types of vehicles, and the model configuration may contain multiple decoder rules (if the rules for decoding differ for the heterogeneous types). For example, decoder rules A 162, decoder rules B 163, and decoder rules C 164 may be sent to the respective vehicles 142, 143, 144 having different signal semantics. In some embodiments, each set of decoder rules provide decoding rules for all the signals in the model configuration. The model configuration and decoder rules may have a one-to-many relationship where multiple decoder rules (e.g., decoder rules A 162, decoder rules B 163, and decoder rules C 164) may be associated with a single model configuration. This one-to-many relationship allows the same signal semantics to be used for data collection and analytics, regardless of in-vehicle network topology and/or technology used in a given vehicle of the fleet.

In some embodiments the data collection scheme controller 108 may manage a signal catalog. A signal catalog may contain signal attributes that are used by the OEMs across multiple models of their vehicles or sensors. The signal catalog may follow a Vehicle Signal Specification (VSS) naming guide and may be accessible using qualified names (e.g., Vehicle.Powertrain.CombustionEngine.FuelType). There may be one unique path per signal of the signal catalog wherein in some embodiments the data collection scheme controller 108 may assign the signal a unique signal id. The data collection scheme controller 108 of the data plane 104 may guarantee that the signal id be unique across the signal catalog. In some embodiments, customers 122a, 122n may create multiple signal catalogs. The multiple signal catalogs may encompass signal attributes that may be used to model different types of vehicles. For example, a catalog may be generated for cars, a catalog for trucks, a catalog for motorcycles etc. A signal catalog for a same vehicle type may have a single catalog to represent all signals for the vehicle type, but in some embodiments multiple signal catalogs may be used to represent different subsets of signals for a same vehicle type. The term "subset" as used herein may not be limited to attributes of one vehicle type but may include one, all, or any number of attributes in any number of types. Furthermore, as used herein, "subset" may include all attributes. of a given vehicle type or only a portion of the available attributes of a given vehicle type. As further discussed in FIG. 2, the data collection scheme controller 108 of the data plane 104 may manage a vehicle model configuration using the signal catalog and the decoder rules to enable a unified signal representation for the vehicle data extraction service 102 to collect data across heterogenous vehicles in a fleet via a workflow that applies the same data collection scheme when extracting data from the heterogenous vehicles in the fleet.

In some embodiments, the data plane 112 manages the receipt of raw data from the vehicles 142, 143, 144 and the delivery of various types of vehicle information such as the vehicle states and the vehicle partition to which the vehicle belongs to the data storage 114 wherein the information may be stored in vehicle states table 186 and vehicle partition table 182, respectively. The in-vehicle computing device(s) 150 may authenticate a connection with the vehicle information extraction service 102 using the data plane 112 via a client certificate authentication (e.g., an X.509 certificate) and private key obtained when the vehicle is registered via the vehicle identity registry 110. In some embodiments, data plane 112 includes vehicle communication interface 180 configured to establish a secure connection with respective vehicles, such as vehicle 142, 143, 144 to send software package 146 and to receive extracted vehicle data 148. In some embodiments, extracted raw data engine 184 may cause the extracted vehicle data 148 to be stored in a separate storage account of the customers 122a, 122n, such as a storage account of a storage service provided by a provider network that also implements the vehicle information extraction service 102. For example, a customer may have accounts with different services offered by a service provider network that also provides the vehicle information extraction service. Thus, a customer may specify whether extracted vehicle information is to be delivered to an account with a given service of the service provider network, such as an object-based storage service, an archive data storage service, a machine learning service, etc. A vehicle partition engine 188 of the data plane 112 may utilize location information and or other sensor information from vehicles of the fleet to determine which partition of the fleet respective ones of the vehicles are associated with. The vehicle partition engine 188 may utilize any number of types of information describing the environment that the fleet is in to determine/infer similar vehicle mobility patterns or similar environmental factors that may be assumed to result in redundant data collection. Such types of information may be used to partition the fleet. In some embodiments, a partition may be determined based on geographical location and/or other factors. In some embodiments, a partition may be determined using two-dimensional factors, wherein the two dimensions are spatial proximity of vehicles and time proximity of the spatial proximity. Said more plainly, how recently or for how long were the vehicles in proximity with one another. For example, partitions A and B may be determine based on geographical proximity in a given time window.

In some embodiments, the partitions of the fleet may be determined based on proximity to various inferences made on the environment. For example, the vehicle partition engine 188 may use data aggregated from the vehicles 142, 143, 144 in order to make a determination that a semantically identified object 192 exists in the environment at some frequency. Based on the proximity to the identified object 192 and/or the frequency of occurrence of the identified object 192, along with location and time proximity variables relative to other vehicles, vehicle 143 may be assigned to partition C. In some embodiments, vehicles may be part of multiple partitions of the fleet. For example, vehicle 143 may be part of partition A as well as partition C. A data collection probability engine 190 may then determine the appropriate data reduction factor to communicate to the vehicles of certain regions through vehicle scheme packets. The data collection probability engine 190 may use various other inferences derived from the environment to calculate a likelihood that vehicles in a given partition are likely to return redundant data. In some embodiments, the inferences may include inferences drawn from a list of vehicle detected objects identified using machine learning techniques, classification of detected objects as stationary, semi-stationary, or dynamic, presence of an accident, etc.

In some embodiments, a model may be generated at a service side of a data extraction service. The model may model the frequency of occurrence of a particular type of object in the environment for which data is to be collected/extracted from a vehicle, along with a model of how probable it is for a given vehicle or vehicle type exhibiting common vehicle behavior (such as moving in a platoon or wave) to encounter the object, along with a time proximity, e.g., how quickly is a given vehicle likely to encounter the given object. Based on these model parameters, the service side of the data extraction service may generate data reduction factors to be applied to vehicles belonging to respective partitions. In some embodiments, the partitions may simply correspond to geographic regions. However, in the same or other embodiments, the partitions may be based on both space and time dimensions. In some embodiments, the partitions may be determined based on other factors. For example, a set of vehicles in geographic proximity to one another and proximate in time that exhibit a common vehicle behavior, such as travelling at a speed that overlaps a speed range of surrounding vehicles may be grouped into a common partition. For example, such a partition may resemble a group of vehicles travelling in close proximity to one another at the same time and at the same speed on a stretch of an interstate highway. In some embodiments, partitions may be dynamically updated based on changes in vehicle behavior. As another example, in some embodiments, common vehicle behavior used to group vehicles into a common partition may be determined using an origin-destination (OD) matrix estimation process. For example, such an estimation process may identify groups of vehicles travelling toward the same destination or between the same origin and destination and group such vehicles into a group to be used to form a partition. In some embodiments, a data extraction service may estimate origin destination flows for vehicles between sets of points and send data reduction probabilities to the grouped vehicles, wherein the data reduction probabilities are determined based on the estimated trajectory of the vehicles, along with other factors as described herein, such as vehicle density in a partition and prevalence of objects of interest in an environment through which the vehicles are travelling according to the determined trajectory. In some embodiments, if a currently updated model maintained at a service side of vehicle data extraction service varies from a previous version of the model used to generate scheme packets sent to vehicles of a fleet by more than one or more threshold amounts, updated scheme packets may be issued to the vehicles reflecting data reduction parameters in accordance with the updated model.

In some embodiments, the data plane 112 of the vehicle information extraction service 102 may further orchestrate analysis and/or visualization to be performed on the extracted vehicle data 148. For example, the extracted vehicle data may be compared to alarm triggers for alarms that cause the customer to be notified. Also, the extracted vehicle information may be organized into visual graphics, such as charts, graphs, or other user interface tools for presentment to the customer. In some embodiments, the extracted vehicle information may be used to train an artificial intelligence (AI) model or may be provided to a machine learning tool to optimize settings of the vehicle. Once authenticated, vehicles 142, 143, 144 may send data to vehicle information extraction service 102 using various publish-subscribe network protocols or other network protocols to transports messages, for example an MQTT protocol. In some embodiments, video frames obtained using one or more video/audio sensors 132 may be sent using encoded video formats, such as Advanced Video Coding, also referred to as H.264. In some embodiments, the in-vehicle computing device(s) 150 may obtain temporary credentials to upload various sensor data. The data plane 112 may directly ingest raw extracted vehicle data 148 after which an extracted raw data engine 184 may use the vehicle model configuration to decode the raw extracted data to physical telemetry messages. In some embodiments, the raw extracted vehicle data may be binary resources containing data such as video frames, images, radar amplitude, temperature data, engine speed, and other information about the vehicle. In some embodiments, the decoded telemetry data may be enriched with vehicle attributes and published to a time-series database of the data storage 114. Enrichment of vehicle data by associating the vehicle attributes allows user to query the vehicle data using attributes of the vehicle and/or the event of interest. In some embodiments, a unique object URL may be associated with a record containing the vehicle data and published to the time-series database.

In some embodiments, in-vehicle computing device 150 may implement a gateway for vehicle 126 or may otherwise be a component of vehicle 126 that has access to data transmitted over one or more buses of the vehicle, such as vehicle communications bus 138. In some embodiments, a bus of a vehicle may transmit multicast vehicle information sent from multiple components of a vehicle, such as electronic control unit 128 (ECU #1) and electronic control unit 130 (ECU #2). Additionally, other components, such as physical sensor 136 and audio/visual sensors 132, may communicate vehicle information over vehicle communications bus 138. The vehicles 142, 143, 144 of the fleet may contain one or more location sensors 131 that is able to obtain the location of the vehicle. In some embodiments the location sensor may be a Global Positioning System (GPS) using cellular, wireless passive, satellite, and other types of GPS systems. The location sensor 131 may obtain location information that is further processed by the location module 154 of the in-vehicle computing device 150 to determine a region that the vehicle is currently located in. This location information and/or other sensor information may be used to determine which partition of the fleet that the vehicle falls under. Vehicle scheme packages 146 may be used by a software application 152 executing on the in-vehicle computing device 150 to determine the conditions controlling the vehicle 142 and sending its data. In some embodiments, a software application 152 may access binary files storage 154 to access the vehicle information transmitted over vehicle communications bus 138. In some embodiments vehicle communications over a vehicle bus may be encoded by the software application 152 and may decode vehicle information transmitted over encoded vehicle communications using binary files and/or configuration files in a binary file storage. The bus traffic decoding and trigger monitoring module 156 may further cause vehicle information, such as the bus traffic and/or other vehicle information such as visual or audio data to be stored in a storage buffer 158. As explained in more detail in FIG. 12, the storage buffer may store encoded and/or decoded vehicle information and other associated vehicle data for a plurality of preceding moments in the past.

In some embodiments, trigger monitoring 160 provided by the software application 152 may monitor the bus traffic to determine a fulfillment of one or more triggering criteria for data extraction provided by the vehicle scheme packets to determine whether or not the triggering criteria has been met. In some embodiments, the vehicle scheme packets may supply a detection of movement to a new partition and/or geographical region as one such triggering criteria. For example, in FIG. 1 a movement from region A to region B of vehicle 142 may fulfill a triggering criterion. The software application 152 may furthermore include a data reduction factor application 156 that retrieves one or more data reduction factors from the vehicle scheme packets to determine the percentage in which a certain sensor data should be obtained/collected for extraction after a triggering event. For example, if the data reduction factor application 156 takes in the data reduction factor and determines that the percentage of temperature sensor data that is to be sent upon fulfillment of a trigger is 50%, the temperature sensor data that is sent by the fleet would effectively be cut in half, for example by reducing a frequency of temperature data transmission. In some embodiments a location module 154 may determine the location of the vehicle 142 using the location sensor 131. If the triggering criteria are met, packet generation module of the in-vehicle computing device 150 may generate one or more packets to be sent back to vehicle information extraction service 102 as raw extracted vehicle data 148.

The data plane 112 may directly ingest raw extracted vehicle data 148 after which an extracted raw data engine 184 may use the vehicle model configuration to decode the raw extracted data into physical telemetry messages. In some embodiments, the raw extracted vehicle data may be binary resources containing data such as video frames, images, radar amplitude, temperature data, engine speed, driver's performance, and/or other information about the vehicle. In some embodiments, the decoded telemetry data may be enriched with vehicle attributes and published to a time-series database of the data storage 114. Enrichment of vehicle data may allow user to query the vehicle data using attributes of the vehicle and/or the event of interest. In some embodiments, a unique object URL may be associated with a record containing the vehicle data and published to the time-series database.

Figure 2:
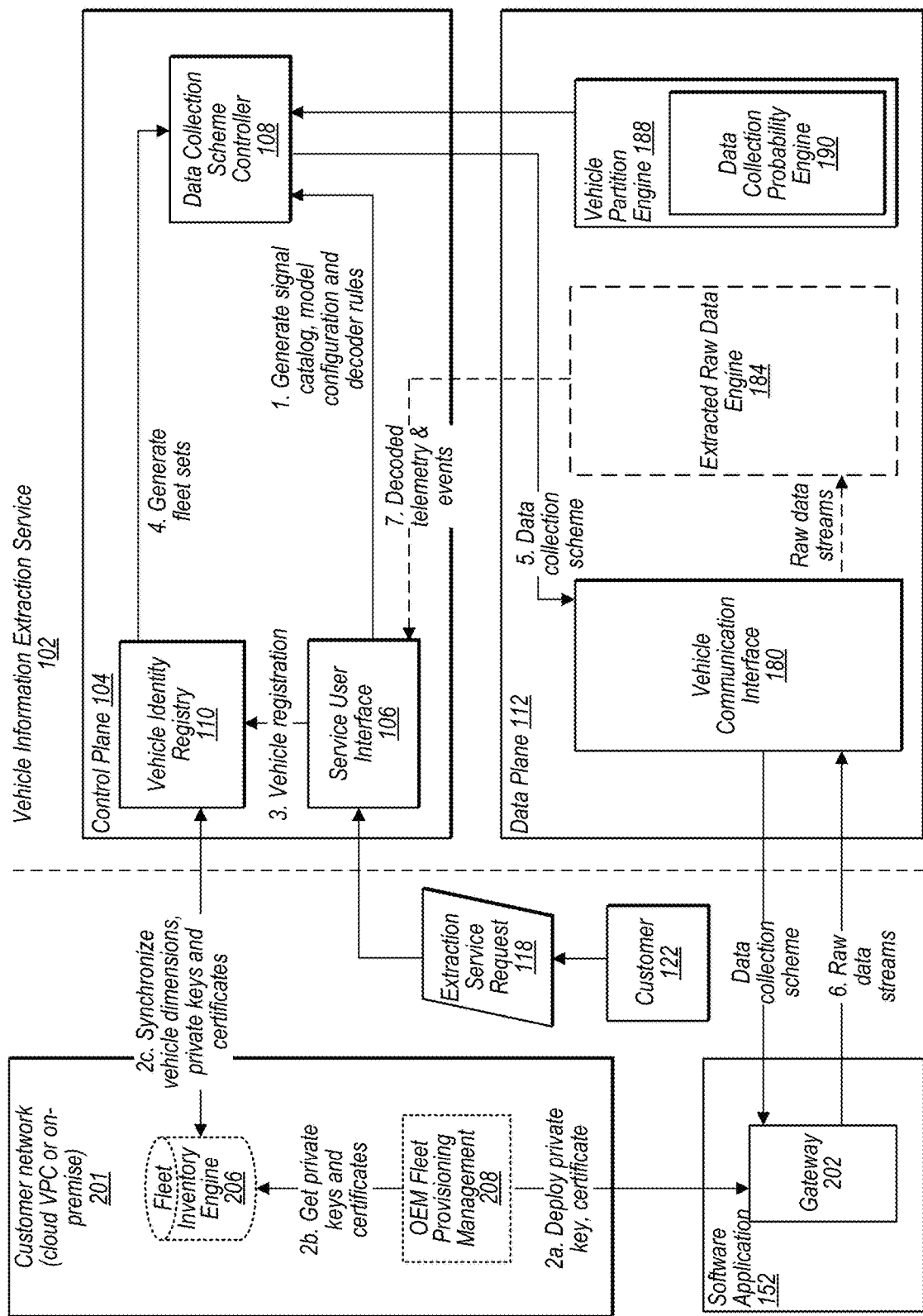
FIG. 2 illustrates a more detailed view of a vehicle information extraction service, its various parts, and interactions that de-couples a vehicle model configuration from an in-vehicle communication signal configuration specific to vehicles, according to some embodiments.

In some embodiments, service user interface 104 may include a designer canvas and a management console as further discussed in FIG. 2. In some embodiments, customers may provide a dictionary file describing proprietary protocols and encoding formats used to communicate vehicle information over a bus from components designed by the customer (e.g., vehicle supplier and/or vehicle component supplier) and/or an associated proprietary access credential file. For example, customer 122a provides service request 118 comprising a vehicle supplier dictionary file and data extraction criteria for vehicle information formatted according to the vehicle supplier dictionary. Additionally, customer 122n may provide submission 120 comprising a separate component supplier dictionary file and data extraction criteria for vehicle information formatted according to the component supplier dictionary. Note that the dictionary file and data extraction criteria are shown in FIG. 1 as being part of a same submission. However, in some embodiments, the data extraction criteria and the dictionary file may be submitted separately.

The dictionary files and associated access credential files received from the customers 122a and 122n may be stored in restricted access dictionary and credential storage 106. The dictionary file/associated access credential file of customer 122a, and the dictionary file/associated access credential file of customer 122n may each be stored in a separate physical or logical container that has restricted access. For example, customer 122n may not able to view customer 122a's dictionary file and access credential file and vice-versa.

FIG. 2 illustrates a more detailed view of a vehicle information extraction service, its various parts, and interactions that de-couples a vehicle model configuration from an in-vehicle communication signal configuration specific to vehicles, according to some embodiments.

In FIG. 2, the customer 122 may send an extraction service request 118 to the service user interface 106 to create a model of a fleet of vehicles. The extraction service request 118 contains information for the data collection scheme controller 108 to generate a signal catalog. A signal catalog may contain all of the signal attributes that are used by the OEMs across all models of their vehicles or sensors. In some embodiments, the signal catalog may contain a subset of signals wherein the subset may include one or more signal attributes of the various vehicle types in any combination. As discussed in FIG. 1, the signal catalog may follow a Vehicle Signal Specification (VSS) naming guide and may be accessible only using its qualified name. In some embodiments, there may be only one unique path per signal of the signal catalog wherein in some embodiments the data collection scheme controller 108 may assign the signal a unique signal id. The data collection scheme controller 108 of the data plane 104 may guarantee that the signal id be unique across the signal catalog. In some embodiments, customer 122 may create multiple signal catalogs any may encompass signal attributes that may model different types of vehicles.

Once a signal catalog has been generated, the data collection scheme controller 108 may generate a model configuration using information obtained from the extraction service request 118. The model configuration may be a collection of signals chosen from the signal catalog that are applicable to that specific vehicle model. For example, the extraction service 112 may be given a sample signal catalog organized with a branch for cruise control, a branch for combustion engine, and a branch for electric engine. When generating a model configuration for a vehicle which has cruise control but uses combustion engine the configuration will contain only the cruise control branch and the combustion engine branch without a branch for electric engine. For a different model of the vehicle that has an electric engine and cruise control, the model configuration will contain the cruise control branch and the battery branch. In some embodiments, the model configuration may be created from all of the signals in the signal catalog. In some embodiments, if there are signals in the signal catalog for which there are no decoder rules, those signals will omit be omitted from the model configuration. The vehicle model configuration may contain only the signals defined in the signal catalog. FIG. 3 further illustrates the vehicle model configuration.

After the model configuration is created, decoder rules (e.g., a decoder manifest or other configuration) for all the vehicle sensors in the model configuration may be obtained for the extraction service request 118. Decoder rules may specify rules for decoding signals on the in-vehicle communication network and enable customers to collect data from the sensors that are listed in the model configuration. For example, the decoder rules may include CAN DBC of a particular model of vehicle, additional protocol specific information to decode in-vehicle signal formats (e.g., a channel Id for signals providing the CAN DBC), and a mapping file that maps signal names given in the CAN DBCs to the signal name given in the model configuration. In some embodiments, given a signal name as defined in the model configuration, the decoder rules may provide parameters necessary for decoding information collected via the sensor, including protocol name (e.g., CAN), message id (for the message within which the sensor is multiplexed), scale, offset, etc.

In some embodiments, the decoder rules may be used by the vehicle information extraction service 102 for decoding the necessary signals remotely, such as at a cloud-based location. In other embodiments, the decoder rules may be sent to the software application 152 of a vehicle (or other vehicle edge device) and used by the software application to send a decoded signal to the vehicle information extraction service 102. In some embodiments, there may be heterogeneous types of vehicles, and the model configuration may contain multiple decoder rules if the rules for decoding differ between vehicle types. In some embodiments, each set of decoder rules provides decoding rules for all the signals in the model configuration. The model configuration and decoder rules may have a one-to-many relationship where multiple decoder rules may be associated with a single model configuration. This one-to-many relationship allows the same signal semantics to be used for data collection and analytics, regardless of in-vehicle network topology and/or technology used in the vehicle. Moreover, this one-to-many relationship enables data collection across a heterogenous fleet of vehicles utilizing different signal formats. Once the decoding rules are provided by the decoder rules for all the signals in the model configuration, the data collection scheme controller 108 generates the decoder rules and marks the model configuration active.

In some embodiments a customer network in a virtual private cloud (VPC) or on-premises network having access to the vehicle software application 152 and its gateway 201 deploys private key and client certificates (e.g., X.509 certificate) through OEM fleet provisioning management 208. A fleet inventory engine 206 may furthermore acquire the deployed private keys and certificates and synchronize the vehicle dimensions, private keys, and certificates with the vehicle identity registry 110. The service user interface 106 then registers the vehicle to be modeled by identifying the model configuration that this vehicle and the decoder rules that a vehicle to be registered is to be associated with. The service user interface 106 provides values of the static attributes that are present in a vehicle model configuration (e.g., vehicle identification number (VIN), model, year, color etc.).

The vehicle identity registry 110 may generate a fleet as a collection or a group of vehicles which are collected together on the basis of some common vehicle attribute. Fleets may be generated on the basis of various vehicle attributes such as, vehicles manufactured in a specific or a range of years, vehicles having the color red, vehicles fuel type, etc. The customer 122 may instruct via the service user interface 106 to create a fleet based on the attributes available in the signal catalog. In some embodiments, fleet creation may involve a fleet creation query or filtering activity based on multiple attributes to create the fleet. Once the fleet is created, the customer 122 may use a fleet to execute various workflows that apply various data collection schemes. In some embodiments, the vehicle identity registry 110 may automatically maintain and update the fleet without customer instructions as the collection of vehicles (which are collected together based on common vehicle attributes) change. In some embodiments, as new vehicles are registered, the vehicle identity registry 110 may automatically add the new vehicles to one or more fleets, or partitions of a fleet, based on the identified common vehicle attributes.

The data collection scheme controller 108 may receive from the customer various data collection schemes or configurations that instruct vehicles what data to collect from the vehicle, when to collect the data, and the frequency at which the data should be published to the vehicle communication interface 180 as well as various other parameters, including a data reduction factor that restricts vehicles in a fleet to sending only a percentage of the time based on total number of vehicles in the same region. In some embodiments, a vehicle partition engine 188 may determine a data reduction factor using the data collection probability engine 190 that restricts vehicles in certain partitions from transmitting data. When creating the data collection scheme, the OEMs or the customer 122 can specify a subset of the signals from the signal catalog that they wish to collect. In some embodiments, the customer 122 may specify either a vehicle Id or a fleet Id on which the data collection scheme is to be sent. The vehicle communication interface 180 receives the data collection scheme and sends this to the selected vehicles or fleets.

In some embodiments, as data is collected from various sensors of the vehicles according to the data collection scheme, resulting raw data streams are sent to the vehicle communication interface 180 and the raw data is decoded using the extracted raw data engine 184. In some embodiments, the extracted raw data engine 184 may use the vehicle model configuration to decode the raw extracted data to physical telemetry messages, which may be accessible to the customer using the service user interface 106. In other embodiments, the data collected may be physical telemetry messages decoded by the vehicle (or other vehicle edge device) using the decoder rules. In some embodiments, the raw extracted data streams may be binary resources containing data such as video frames, images, radar amplitude, temperature data, engine speed, driver's performance, and other information about the vehicle. In some embodiments, the decoded telemetry data (decoded using the decoder rules by the vehicle information extraction service 102 or software application 152 of the vehicle) may be enriched with vehicle attributes and published to a time-series database of the data storage for analysis.

FIG. 3 illustrates a graphical view of an example vehicle model configuration having a hierarchical tree structure that uses a vehicle signal catalog and enables a unified signal representation to be used in collecting data using a common data collection scheme across a fleet of heterogenous vehicle models, according to some embodiments.

A vehicle model configuration 300 provides a serialized, digital format of vehicle attributes, sensors, actuators, and their relationships. The vehicle model configuration 300 provides formats necessary for representing relationships between ECUs and sensors, as a hierarchical model that reflects the domain-based format of modern vehicle network systems. For example, the model configuration 300 contains all or a subset of signal types in a signal catalog. The signals provided by the signal catalog may be arranged in a hierarchical structure as depicted in the model configuration 300 and may include various signal types such as attribute, branch, sensor, and actuator. The model configuration allows attachment of static attributes to ECUs and domains such as "VIN" 306, "Model" 308, and "Brand" 330 that facilitate creation of fleets based on fleet rules as discussed in FIG. 2.

In some embodiments, the vehicle model configuration may automatically be generated from an automotive open system format (AUTOSAR) XML configuration file or ArXML, CAN DBC, or a field bus exchange format (FibEx) file, or manually authored by the OEM or the designer. It can be further manipulated and updated after its creation. In some embodiments, the model manifest may utilize a VSS format. A vehicle model configuration 300 may provide the formats necessary for representing relationships between ECUs and sensors as a hierarchical model that reflects the domain-based format of modern vehicle network systems. For example, a query 352 of vehicle model configuration 300 for "Drivetrain.Transmission.Speed" returns the relevant type of "sensor" for the signal "speed" 336 that is under "drivetrain" 332 and "transmission" 334. It allows the customer to specify units and data types for sensors that are necessary for human readable data exchange and defining alarm rules on sensors.

Figure 4:
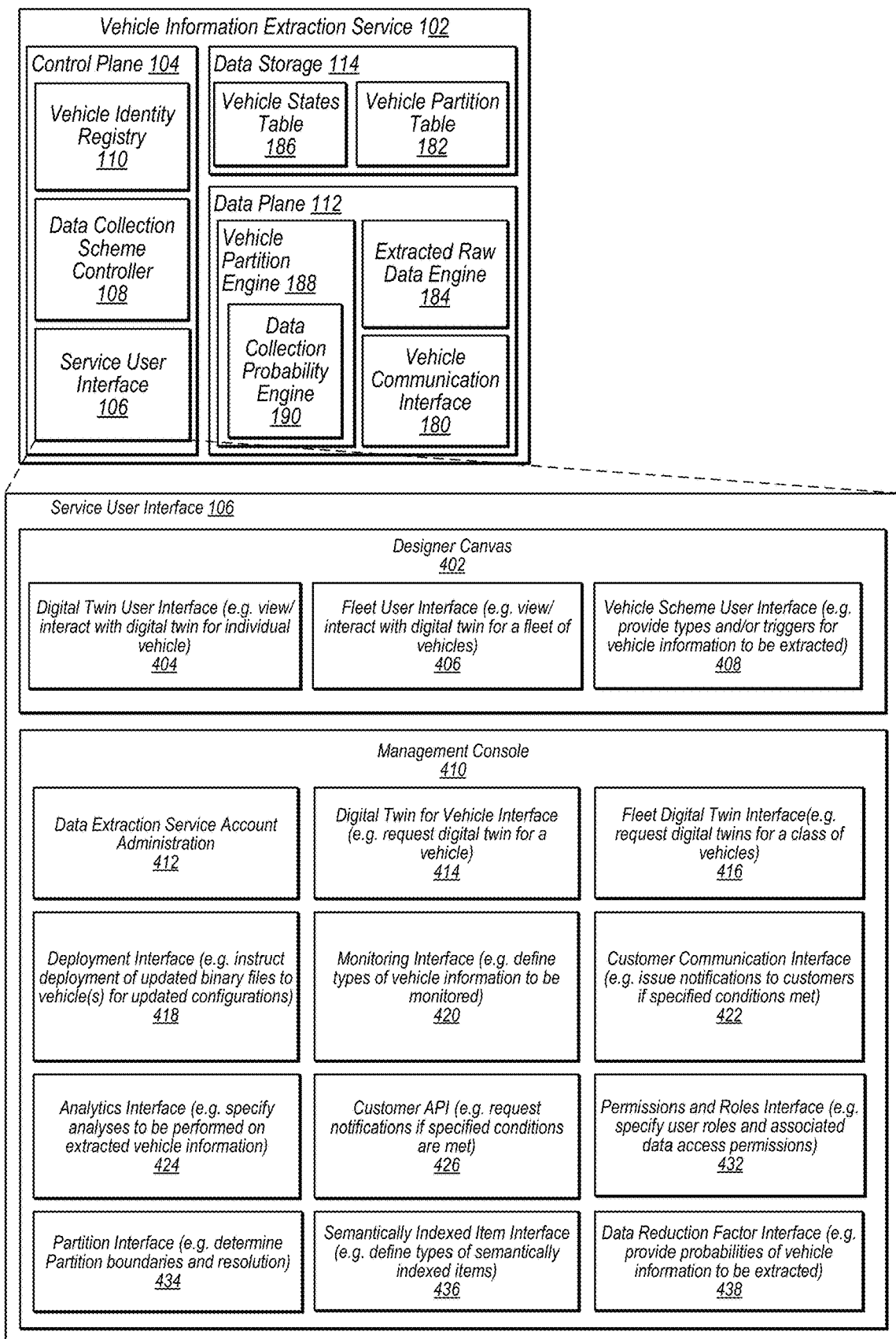
FIG. 4 illustrates a more detailed view of a designer canvas and a management console of a service user interface for a vehicle information extraction service, according to some embodiments.

FIG. 4 illustrates a more detailed view of a designer canvas and a management console of a service user interface for a vehicle information extraction service, according to some embodiments.

In some embodiments, a service user interface of a vehicle information extraction service, such as service user interface 108, may include a designer canvas, such as designer canvas 402, and a management console, such as management console 410. In some embodiments, a designer canvas may enable a customer engineer, such as an engineer of a vehicle supplier or vehicle component supplier to view digital twins comprising data extracted from real-world vehicles. The designer canvas may also enable the engineers to modify types of data monitored/extracted and/or triggering criteria for extracting data, including a data reduction factor based on number of vehicles in a partition. In some embodiments, the designer canvas may enable customer engineers to log into a web application using their own corporation credentials (e.g., the credentials issued to the engineers from the corporate customer) without requiring each engineer to have an account or credential with the vehicle information extraction service. Using the web application, the customer's engineers may be able to access, visualize, and monitor vehicle data. The designer canvas may also enable the customer to build custom reporting or analytics, or to incorporate vehicle data into their existing software environments. In some embodiments, the web applications offered by the vehicle information extraction service may be pre-configured or easily configurable without requiring the customer to generate code for the web-applications. In some embodiments, a management console for a vehicle information extraction service may provide additional features and may further enable the customer to manage the customer's account with the vehicle information extraction service, such as providing access to proprietary dictionaries, creating additional digital twins, etc.

In some embodiments, a designer canvas, such as designer canvas 402, includes a digital twin user interface 404, a fleet user interface 406, and a vehicle scheme user interface 408. The digital twin user interface 404 may enable an engineer of the customer to view and interact with a digital twin for a given real-world vehicle, wherein the digital twin comprises near-real time vehicle information extracted from the real-world vehicle. The fleet user interface 406 may enable an engineer of the customer to view and interface with a digital twin representing a class (or fleet) of vehicles. The fleet digital twin may include aggregated data representing near real-time states of a class of vehicles matching a fleet definition for the fleet. The fleet digital twin may include twins of vehicles belonging to various OEMs and may have differing in-vehicle formats. The digital fleet twins may be generated by using the vehicle decoder rules and vehicle model configuration to combine the various in-vehicle formats into a single fleet using a homogeneous vehicle signal format. Additionally, digital twin user interface 404 and fleet user interface 406 may enable an engineer of the customer to view and interact with historical data extracted from the real-world vehicle or the fleet of real-world vehicles. In some embodiments, a digital twin may be created for a vehicle using designer canvas 402 prior to the real-world vehicle being built.

In some embodiments, designer canvas 402 may include a vehicle scheme user interface, such as vehicle scheme user interface 408. Vehicle scheme user interface 408 may enable an engineer of the customer to provide/modify types of vehicle information that are to be extracted from a vehicle or fleet of vehicles as well as triggering criteria for extracting the vehicle information. For example, if troubleshooting a given system, the engineer may modify the data extraction via the vehicle scheme to include additional types of vehicle information to be extracted such as data from sub-components of the system requiring troubleshooting. The vehicle scheme user interface 408 may be used by the engineer to determine a vehicle model configuration and respective decoder rules of vehicles.

Management console 410 includes data extraction service account administration 412, which may be used to manage the customer's account, such as billing, contact information, etc. Additionally, management console 410 includes digital twin for vehicle interface 414 and fleet digital twin interface 416. These interfaces may be used by the customer to authorize additional digital twins be created for either an individual vehicle or a fleet of vehicles. In some embodiments, a prompt in the designer canvas 402 may cause a request to be queued for approval by the customer, wherein the approval causes digital twin interface 414 or fleet digital twin interface 416 to create additional digital twins. Management console 410 includes deployment interface 418 of management console 410 that may cause generated binary files to be deployed to vehicles that are to be monitored. In some embodiments, a management console, such as management console 410, may further include a monitoring interface 420 for receiving and viewing extracted vehicle information. In some embodiments, the monitoring interface may also enable specification of monitoring parameters such as alarms to be triggered if certain thresholds are met in the extracted vehicle information. In some embodiments, the binary files may be generated by the vehicle information extraction service 102 and provided to the customer for deployment into the customer's vehicles.

Management console 410 includes analytics interface 424 for defining analysis to be performed on extracted vehicle information and includes customer API interface 426 that enables customers to specify analysis, alarms, notification parameters, etc. Additionally, management console 410 includes customer communications interface 422 configured to issue notifications to the customer if certain alarm thresholds are met in the extracted vehicle information. In some embodiments, management console 410 further includes permissions and roles interface 432, which may enable a customer to define access roles for different types or classes of users (which may be employees of the vehicle supplier or vehicle component supplier that are the customer of the vehicle information extraction service). For example, some users may be assigned roles that only permit the use of pre-configured vehicle information extraction configurations, while other users may be provided roles that enable development of new vehicle information extraction configurations, such as to delve into operations of particular components of a vehicle more deeply.

Management console 410 includes region interface 434 for determining region boundaries and resolution of the region boundaries that may be used to determine vehicle fleet partitions. As further discussed in FIG. 8. the region interface 434 may be used by the customer to divide a map into gridded regions having region unique identifiers that define boundaries of a region as well as to change the resolution of the region boundaries. Additionally, management console 410 includes semantically indexed item interface 436 that defines types of semantically indexed items. The customers may use the semantically indexed item interface 436 to identify classifications of a detected visual object such as stationary objects (e.g., traffic lights and street signs), semi-stationary objects (e.g., objects that are likely to change but with low frequency, such as lane closures, transient objects (e.g., bicyclist or other vehicles), or any other classifications of one or more specific objects. Indexed item interface 436, in some embodiments, may be used to make inferences regarding mobility patterns or other environmental factors of the fleet that may be used to determine likelihood of data being returned by the vehicle being redundant data. The indexed item interface 436 may use data aggregated from various sources, including images or other information obtained by the fleet of vehicles. In some embodiments, management console may include a data reduction factor interface 438 that is used by the customer to provide probabilities of vehicle information to be extracted. For example, the engineer may designate probability of data extraction of a stationary object for a partition of vehicles around that stationary object as 0.5 when the number of vehicles in a region ranges between 100 to 200 vehicles.

It should be noted, that in some embodiments, a vehicle data extraction service may limit partition definitions such that resulting partitions have at least a threshold number of vehicles included in the partitions. For example, in some embodiments, a vehicle data extraction service may limit partitions to including at least a certain number of vehicles. Thus, vehicle anonymity is maintained. For example, if a number of vehicles in a given partition is sufficiently large, say 20 vehicles as an example, the collected vehicle information is sufficiently anonymous. Thus, if a partition definition is submitted by a customer that results in partitions comprising fewer than the minimum threshold number of vehicles, dynamic data reduction may be disabled by the vehicle data extraction service. Additionally, in some embodiments, updates to transmission probabilities may be disabled from being sent to vehicles of a fleet if there are not at least a threshold number of vehicles included in a given partition. In some embodiments, various threshold may be used, such as 20 vehicles as described above or other thresholds, such as e.g., 5-10 vehicles. Additionally, on the cloud side of the service information that personally identifies individual vehicles may not be collected, or if collected filtered out from inclusion in the results of the data collection.

Figure 5A:
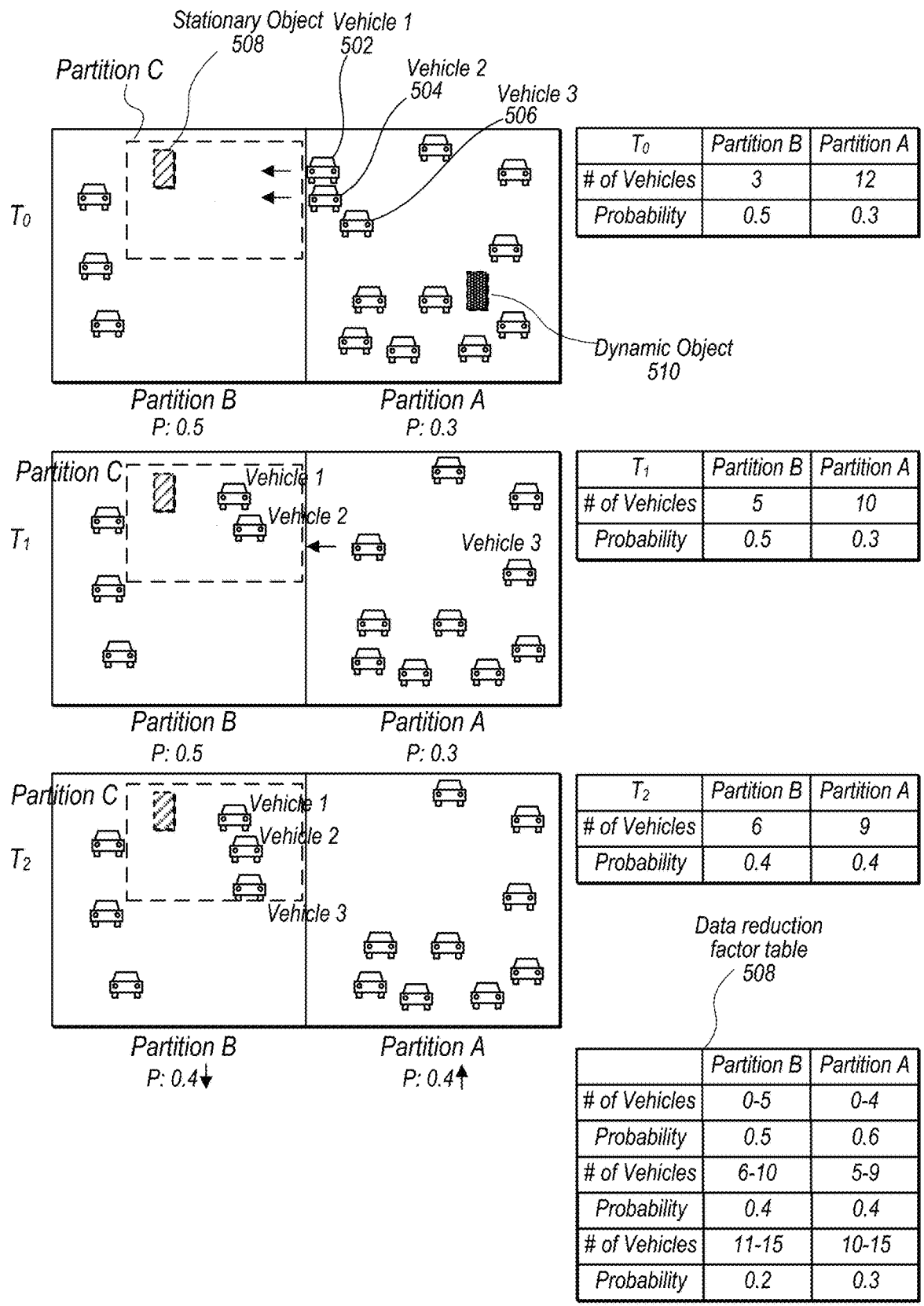
FIG. 5A illustrates a more detailed view of a fleet of vehicles using a dynamic vehicle data extraction service to determine a data reduction factor to be applied for information extracted from vehicles of a fleet, wherein the dynamic vehicle data extraction service optimizes an amount of data extracted based on changing vehicle density at different moments in time due to vehicle environment, vehicle movements, and various partitions according to some embodiments.
Figure 5B:
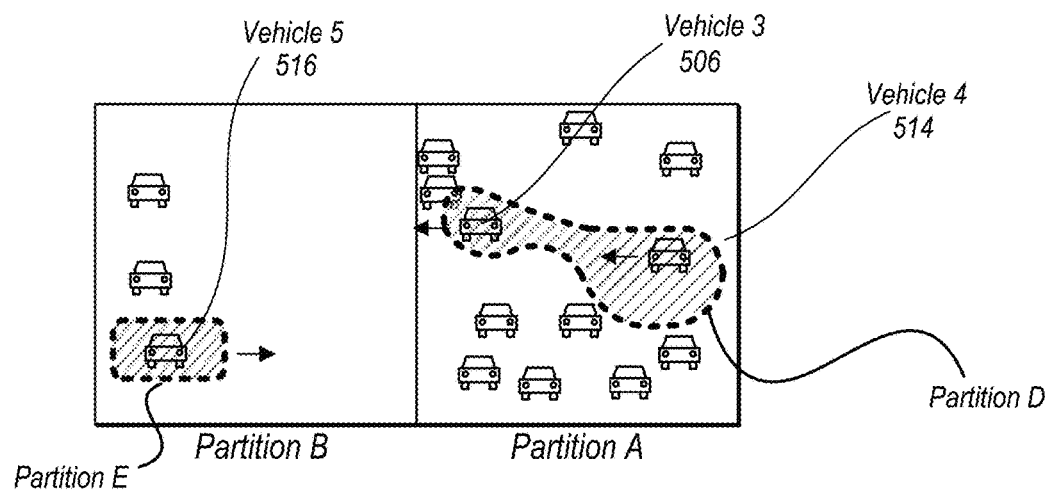
FIG. 5B illustrates the dynamic vehicle data extraction service applying dynamic data reduction for multiple non-uniform partitions based on similarity of vehicle mobility patterns, according to some embodiments.
Figure 5C:
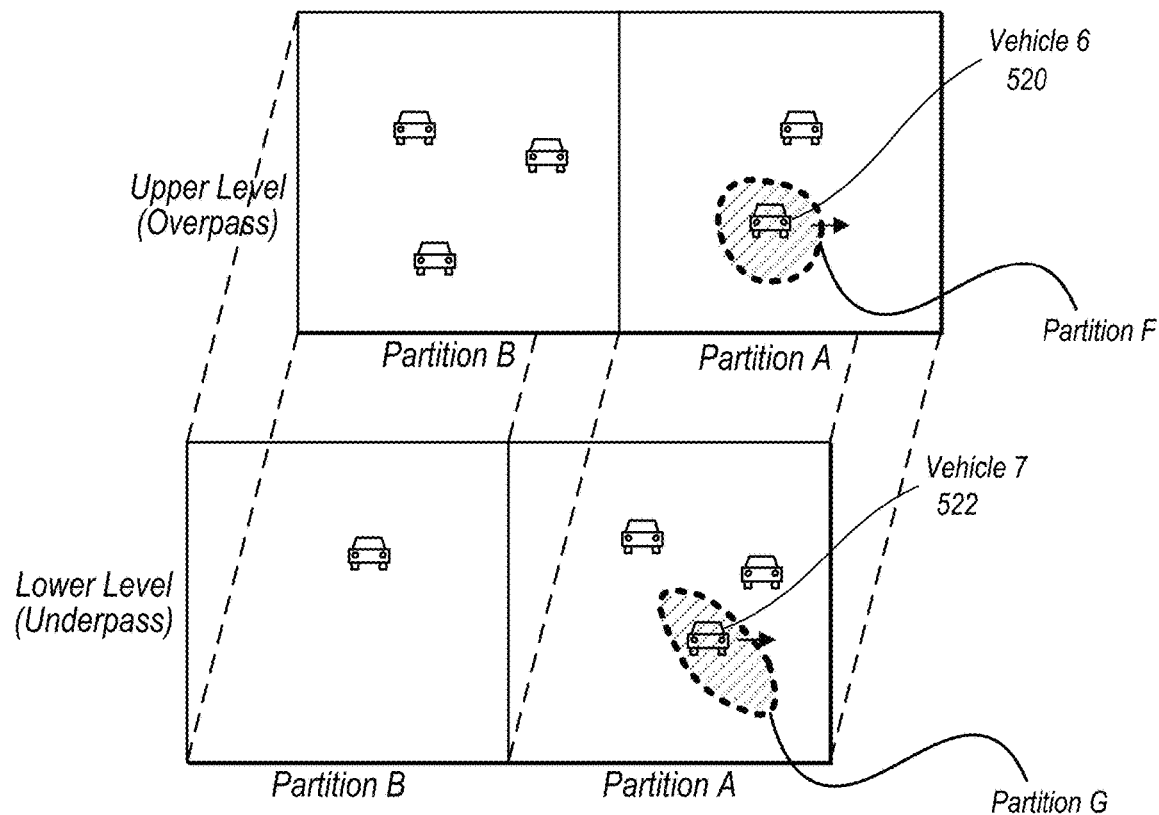
FIG. 5C illustrates a dynamic vehicle data extraction service applying dynamic data reduction for multiple non-uniform partitions in a region that overlap one another and that are at different elevations, wherein the overlapping partitions are determined based on vehicle environment or other environmental factors, according to some embodiments

FIG. 5A-C illustrate more detailed views of a fleet of vehicles using a dynamic vehicle data extraction service to determine a data reduction factor and optimizing an amount of data extracted based on changing vehicle densities at different moments in time due to vehicle movements, according to some embodiments.

In FIG. 5A, a fleet of vehicles may be placed in various partitions. As further discussed in FIG. 8, Partitions A and B may be configured to be based on various geographical regions. However, as further discussed below, in some embodiments, partitions may have irregular shapes that are not bound by geographic boundaries. In some embodiments, a given geographic region may comprise multiple partitions.

As shown in FIG. 5A, regions associated with partitions A and B (i.e., "partition A" and "partition B") may be increased in size or reduced in size by the vehicle data extraction service and changes in the nature of the partitions, including their boundaries, may be communicated to the vehicles. In some embodiments, multiple partitions may be drawn based on proximity to certain inferences made on the vehicle environment. For example, partition C may encompass vehicles near a certain distance away from a stationary object 508. In some embodiments, the partition information may be communicated through the vehicle communication interface of the vehicle information extraction service. The vehicle data reduction service may maintain one or more partition information tables with the corresponding partition information, including information identifier. Although in FIG. 5A, a crossing of boundaries from one partition to another are based on geographical locations, various changes in the vehicle such as proximity to an identified object, vehicle speed, or others may be considered when determining whether or not the vehicle is crossing partition boundaries.

In some embodiments, a vehicle environment may be represented as an overlay, for example on a geographic map, wherein the overlay comprises objects identified in the vehicle environment based on previously collected vehicle information. For example, an inference about what objects are included in a vehicle environment may be drawn from information collected from a vehicle or other vehicles in a similar vehicle environment or location. In some embodiments, the prevalence of a particular type of object may provide insight into the likely prevalence of another type of object. Thus, in some embodiments, probabilities used for dynamic data reduction may further be based on inferences drawn from a vehicle environment.

At $T_0$ there may be a certain number of vehicles of a fleet in partition A and partition B. Vehicle 1 502, Vehicle 2 504, and Vehicle 3 506 are in the same fleet of vehicles sending data to the vehicle data extraction service and may include various models having differing OEMs as discussed in FIG. 1. At $T_0$ the number of vehicles in partition A and partition B are 12 and 3 respectively. The vehicle data extraction service may maintain one or more tables 508 containing information regarding data reduction factor/probability of returning select sensor information for the partitions/vehicles in the partitions. Each of the partitions may comprise vehicles receiving a certain data reduction factor/probability that would change based on the number of vehicles in the partition, if a sufficient change in vehicle count were to occur such that a model used for data reduction by the service was updated. For example, as the number of vehicles in a partition increases, the concentration of the vehicles in the partition may send an increased number of redundant data. As the number of vehicles in a partition grows, the probability of sending a selected sensor data may increase. On the other hand, as the number of vehicles in a partition decreases, the concentration of the vehicles in that partition may be diminished such that the probability of the select sensor data being extracted may be required to be increased to collect sufficient data for analysis. Furthermore, the data reduction factor/probabilities may be based on presence of various inferences made about the environment by the vehicle information extraction service. For example, based on environment information, such as images detected by the vehicles of the fleet, the presence of stationary object 508, dynamic object 510, and other inferences made regarding the partitions, the vehicle data extraction service may make inference about the population of objects of interest in a partition in which a vehicle resides. These inferences may be used to determine the data reduction factor. For example, based on the total number of dynamic objects 510 near partition A or number of stationary objects in partition B, the data reduction factor may be changed for each partition. Other inferences such as vehicle movement patterns or the number of stoplights in a region or various other inferences regarding the vehicle environment may be used to determine the data reduction factors of certain types of sensor data. In some embodiments, an inference made for a partition, such as the presence of a dynamic object 510 or other objects may be modified by a decay function wherein the objects have a lifespan of likely presence in the partition and the objects' effects on the data reduction factors decay over time. For example, the dynamic object 510 may be present at $T_0$ but may be removed at $T_1$.

In some embodiments, the probability may change in a dynamic manner based on the number of vehicles or vehicle density of a partition or changes in various inferences. In some embodiments, an update of the data factor may be sent to the vehicles of a certain partition only after the total number of vehicles in the partition exceeds a certain threshold number of vehicles. The threshold number of vehicles may vary based on factors such as the partition, the fleet, type of sensor data, etc. The data reduction factor table 508 depicts a sample threshold range required to send an update to the vehicles. FIG. 5. depicts the probability of data extraction of a select data for partition B as 0.5 when the number of vehicles in a partition ranges from 0 to 5 vehicles, and the probability of data extraction of a select data for partition A as 0.3 when the number of vehicles in a partition ranges from 10 to 15 vehicles. In some embodiments, instead of a set probability for a range of vehicles, the probability may differ based on the number of vehicles in that partition. At $T_0$, Vehicles 1 502 and Vehicle 2 504 are shown moving out of partition A to partition B, and once the two vehicles have crossed the partition boundary at $T_1$, the vehicles may send a location information or other relevant sensor information to the vehicle data extraction service. In some embodiments, the vehicle may send information identifying the partition information in addition to the location of the vehicle.

At $T_1$, the number of vehicles in partition A and partition B are 10 and 5 respectively and the vehicle data extraction service may update the one or more partition information tables with the resulting change in the number of vehicles at each of the respective partitions A and B at $T_1$. The change in number of vehicles may not trigger an update in the probability of sensor data extraction in the fleet if the number of vehicles in the partition does not exceed the threshold amount required to send an update. In FIG. 5A as an example, the probability of data extraction of a select data for partition B is 0.5 when the number of vehicles in a partition ranges from a minimum threshold for dynamic data reduction (which is greater than 1) to 5 vehicles and because the total number of vehicles in the fleet in partition B remained within the range, the probability remains the same. Note that in actual implementations, the numbers of vehicles may be much larger, such as 100 s, 1,000 s, 10,000 s, etc. of vehicles. However, for ease of illustration, smaller numbers of vehicles are used in FIGS. 5A-5C. Similarly, the probability of data extraction of selected data for partition A remains 0.3 as the number of vehicles in a partition ranges from 10 to 15 vehicles. At $T_1$, vehicles 3 is shown moving out of partition A to partition B, and once the vehicle have crossed the partition boundary at T2, vehicle 3 506 may send a location information or other sensor information to the vehicle data extraction service. In some embodiments, the vehicle may send information identifying the partition information in addition to the location of the vehicle.

At $T_2$, the number of vehicles in partition A and partition B are 9 and 6 respectively and the vehicle data extraction service may update the one or more partition information tables with the resulting change in the number of vehicles at each of the respective partitions A and B at $T_2$. This change in the number of vehicles at $T_2$ in both partitions A and B have moved both partitions past the threshold amounts. For example, in FIG. 5A, the probability of data extraction of a select data for partition B is 0.4 as the number of vehicles in partition B falls within a range of 6 to 10—this is a change from $T_1$ wherein the total number of vehicles was in the min. for data reduction to 5 range. In partition A, the total number of vehicles have decreased to 9 and have moved past the threshold range from 10 to 15 to 5 to 9 vehicles. Therefore, the partition A's probability of data extraction increases to 0.4. In some embodiments, when there is a change in the probability of data extraction of the sensor data in a partition, a new vehicle scheme may be sent to the vehicles in the fleet within that partition. For example, all of the vehicles of the fleet in partition A at $T_2$ would receive a new vehicle scheme that communicates to the respective vehicles in partition A of the new data reduction factor/probability of data extraction of the sensor data.

FIG. 5B illustrates vehicles using the dynamic vehicle data extraction service to optimize amounts of data extracted using multiple non-uniform partitions based on similarity of vehicle mobility patterns, according to some embodiments. For example, vehicle 3 506 and vehicle 4 514 may be traveling in the same direction or may be traveling in similar mobility patterns (e.g., traveling at a similar speed, traveling by an identified object, etc.) and may be placed in the same partition, partition D. In contrast, vehicle 5 516 may be traveling in an opposite direction and/or may be traveling in a different mobility pattern and may be placed in partition E. As further discussed in FIG. 8, partitions A and B may be configured to be based on various geographical regions whereas partitions D and E may be based on environment information and various inferences made regarding the environment. Regions associated with any of the partitions may be increased in size or reduced in size according to the vehicle data extraction service and changes in the nature of the partitions, including their boundaries, may be communicated to the vehicles. In some embodiments, multiple partitions may be drawn based on proximity to certain inferences made on the vehicle environment.

FIG. 5C illustrates vehicles using the dynamic vehicle data extraction service to optimize amounts of data extracted using multiple non-uniform partitions in an overlapping region but in different partitions based on the vehicle environment or other environmental factors, according to some embodiments. For example, vehicle 6 520 and vehicle 7 522 may be traveling in the same direction and may also be in the same geographic region but may be at different levels. For example, vehicle 6 520 may be traveling in an upper level (overpass) whereas vehicle 7 522 may be traveling in a lower level (underpass) of a bridge and therefore may be placed in different partitions such as partition F and partition G. Although the two vehicles may have similar direction and geographical location, they may nevertheless be placed in a different partition due to the environmental differences or other factors, such as different speeds. In some embodiments, environments of special interests, such as underpasses, may be considered a separate partition.

Figure 6:
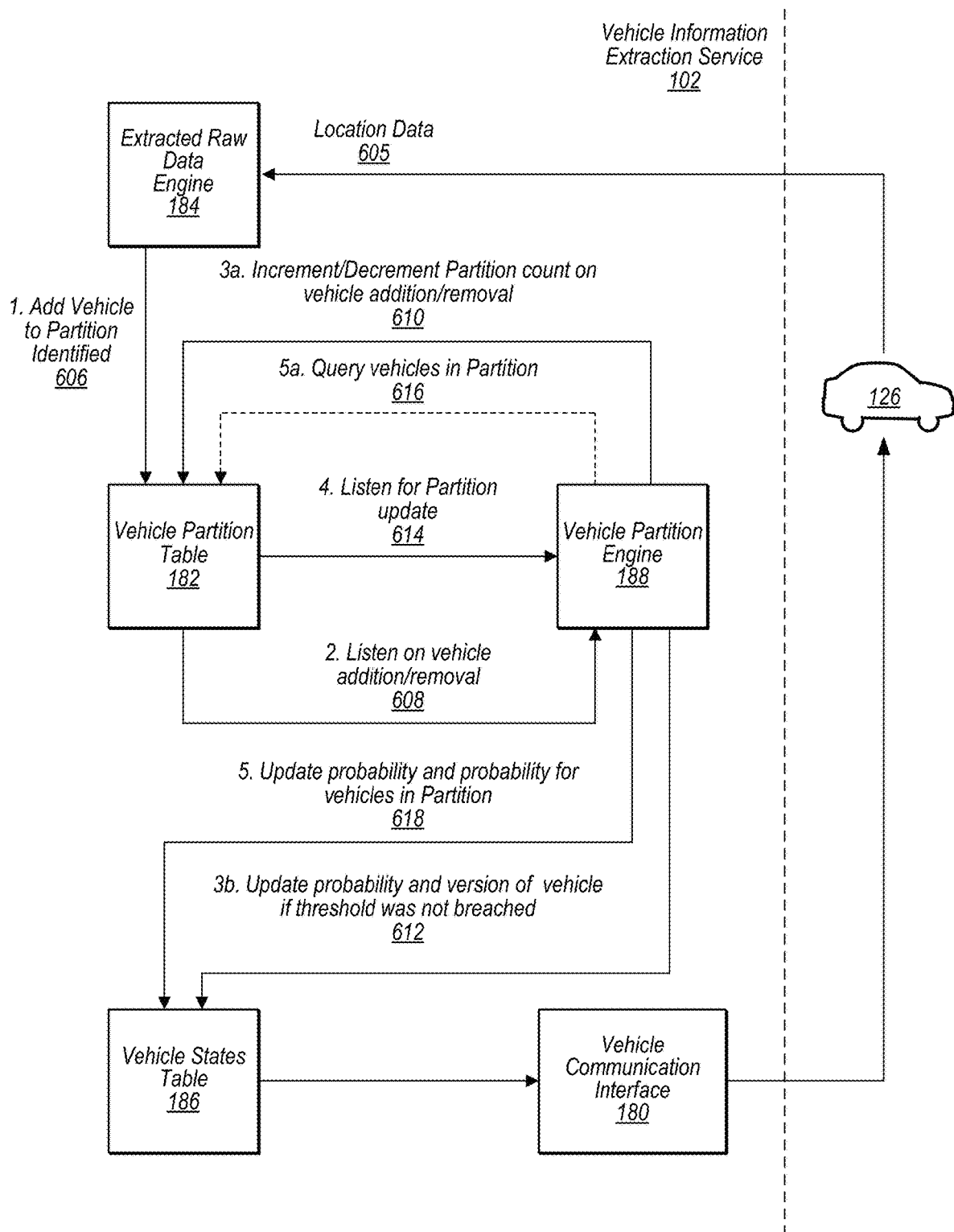
FIG. 6 illustrates a logical block diagram illustrating various components of a vehicle data extraction service, interactions of the components with vehicle movements, and impacts of vehicle movements on respective probabilities of data extraction, according to some embodiments.

FIG. 6 illustrates a logical block diagram illustrating various components of a vehicle data extraction service, interactions of the components with movements of a vehicle, and impacts of vehicle movement on the probability of data extraction, according to some embodiments.

In this example, vehicle 126 of a fleet of vehicles has sent a location data 605 identifying the location of the vehicle 126. In some embodiments the location data 605 may have been sent to the vehicle data extraction service through a triggering event such as a crossing of a partition boundary as defined by the vehicle extraction service. In some embodiments, the location data may further include a unique partition identifier specifying the partition that the vehicle is in. If the partition identifier is not specified in the location data 605, the vehicle extraction service 102 may determine the partition identifier based on the location data 605 and send the information to the partition information table 603 and add the relevant vehicle information to the partition identified in the location data 605. In some embodiments, the extracted raw data engine 184 would furthermore modify the vehicle partition table 182 to remove the identified vehicle from a previous partition identified as having the vehicle 126 located therein to match the current location of the vehicle.

A vehicle partition engine 188 of the vehicle data extraction service may interact with the vehicle partition table 182 to make further queries and edits to the table. In some embodiments, the vehicle partition engine 188 listens to vehicle additions/removal 608 with regard to partitions of the vehicle fleet which would indicate to the vehicle partition engine 188 to increase the total number of vehicles in the corresponding partition. The vehicle partition engine 188 may determine the total number of vehicles in each of the respective partitions and store them inside the vehicle partition table 182. In some embodiments, the vehicle partition table 182 may maintain information regarding the total number of vehicles in the respective partition. As discussed in FIG. 5A-5C, if the total number of vehicles in a partition changes beyond a threshold range, a new probability of data extraction/a new data reduction factor is determined for that partition. In some embodiments, the vehicle partition engine 188 may listen for updates 614 and determine that the total number of vehicles in a partition has increased/decreased upon a vehicle entering or exiting a partition, wherein the increase/decrease is beyond a threshold range. In response, the vehicle partition engine 188 may create new entries in a vehicle states table 186 or update existing entries to store the respective probabilities of data extraction that the vehicles should have after the change 618. In some embodiments the vehicle partition engine 188 may perform a query 616 of the vehicle partition table 182 to identify all of the vehicles in the partition to send the new probability. The vehicle states table 186 may then be used by the vehicle communication interface 180 to send the new probabilities of data extraction or a data reduction factor to the relevant vehicles in the fleet. In some embodiment, all the vehicles in the partition belonging to the fleet and having changed probabilities for data extraction may be sent a new vehicle schema having the updated probability and/or data reduction factor.

Figure 7:
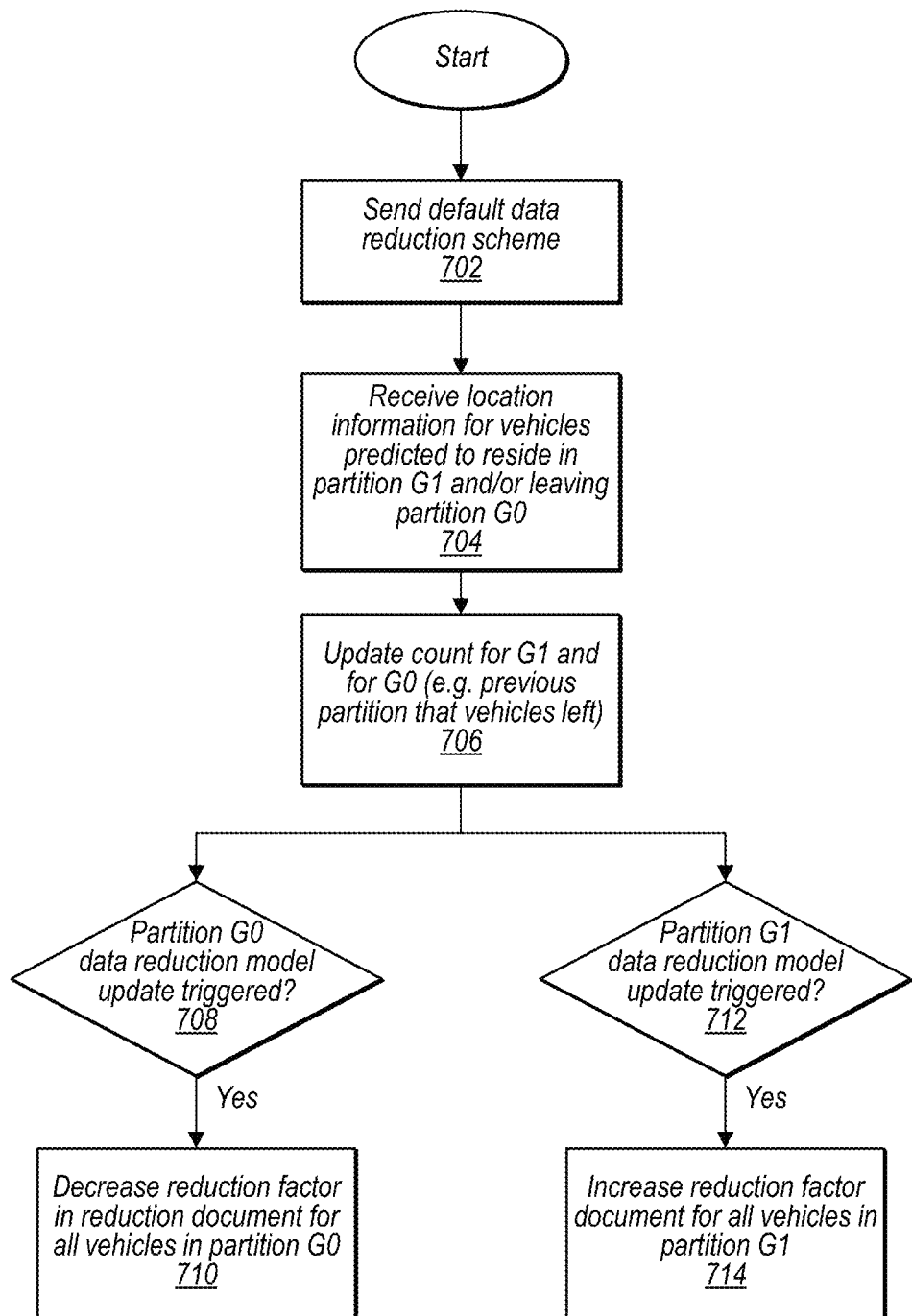
FIG. 7 illustrates a flowchart of operations performed by a vehicle information extraction service with regard to transition of a vehicle from one partition to another and illustrates operations to determine whether updated probabilities and/or data reduction factors for data extraction are to be sent, according to some embodiments.

FIG. 7 illustrates a flowchart of operations performed by a vehicle information extraction service with regards to a transition of one or more vehicles from one partition to another and illustrates operations to determine whether updated probabilities and/or data reduction factors for data extraction are to be sent, according to some embodiments.

At block 702, a default data reduction scheme is sent to the vehicles in a fleet of a partition. The data reduction scheme may contain information instructing the vehicle of signal data to collect and instruct the vehicle of events that trigger such collection. The data reduction scheme may furthermore contain a data reduction document based on the data duplication level, wherein the data duplication level is used to determine a probability for a data reduction method.

At block 704 the vehicle information extraction service receives location information for vehicles predicted to reside in partition G1 and/or predicted to be leaving partition G0 to join partition G1. The vehicle information extraction service may receive the location information and determine location predictions based on GPS information as discussed in FIG. 1. In some embodiments, the location information may identify the partition identification information as well as the location information. The location information may furthermore contain the partition information for the previous location.

At block 706 the vehicle information extraction service updates the count for partition G1 and decrements the count for partition G0. At block 708, the vehicle information extraction service determines whether a data reduction model update has been triggered such that the data reduction factor in the partition G0 is to be updated. At block 712, the vehicle information extraction service determines whether a model change has been triggered such that the data reduction factor to be applied at vehicles in the partition G1 is to be updated. In some embodiments the two blocks (708 and 712) checking whether the trigger has been reached may be performed concurrently. At block 710 if the trigger is met, the reduction factor is decreased for all of the vehicles in partition G0. In a similar manner, at block 714, if the other trigger has been met, the data reduction factor is increased for all vehicles in partition G1.

Figure 8:
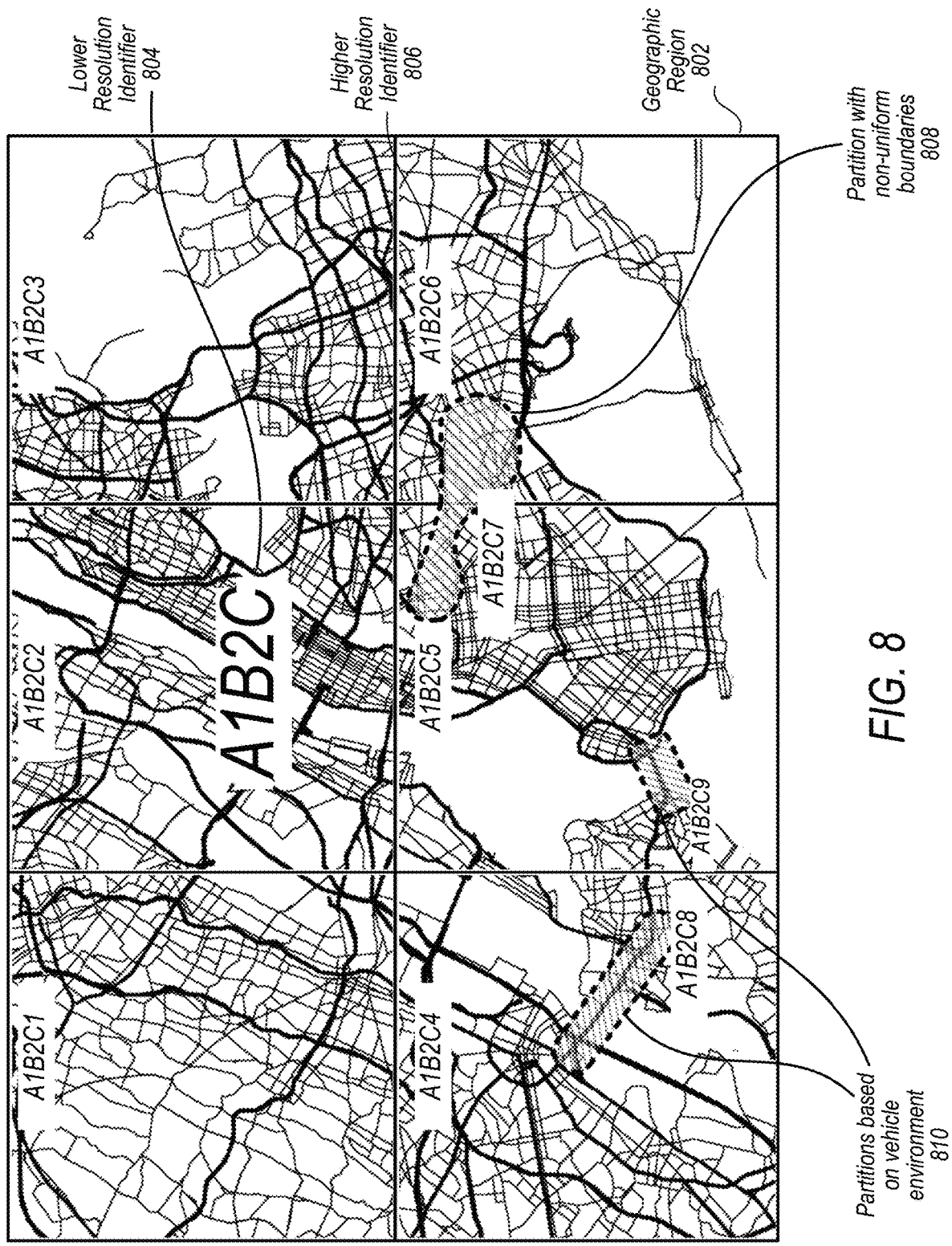
FIG. 8 illustrates an example map used in a vehicle data extraction service that divides the map into regions and enables drawing of region boundaries for multiple regions and changing a resolution of the boundaries to vary granularity and/or vehicle count per region, according to some embodiments.

FIG. 8 illustrates an example map used in a vehicle data extraction service that divides the map into gridded geographic regions and enables drawing of boundaries of multiple partitions and changing a resolution of the boundaries, according to some embodiments.

In FIG. 8, a geographic region 802 on which is implemented a gridded system wherein the map is divided into partitions having certain boundaries is shown. Whereas latitude and longitude, represent one single point, the gridded system of dividing the map allows description of a region, which in some circumstances may correspond to a partition. The regions may be identified and organized by unique identifiers that define the respective regions through a geocode system utilizing blocks of characters and lengths of the identifiers. Some partitions may correspond to geographic region boundaries, but other partitions may fall within the boundaries of a geographic region. A partition may not be a parallelogram such as a map grid depicted but may have non-uniform boundaries.

For example, FIG. 8 depicts the geographic region 802 identified by a lower resolution identifier 804 using the identifier "A2B2". FIG. 8 moreover depicts the geographic region 802 further sub-divided into six sub-partitions using a higher resolution identifier 806 such as "A1B2C1", "A1B2C2", and "A1B2C . . . ". Each of the partitions are assigned a new identifier starting with the same string from its parent and end with another character which provides an efficient way to query whether the vehicle is in a bounded area of the map. Each of the partitions or sub-partitions may be use to organize various instances of information drawn from a vehicle fleet or other sources and used to organize various inferences regarding the partitions. For example, an inference may be made of partition "A1B2C3" as having certain number of miles of major freeways and a certain percentage more miles of freeway versus partition "A1B2C5". In other embodiments, certain objects may be detected and classified using machine learning techniques to determine a certain number of stop signs in a partition. One or more of various inferences made of the partition may inform the vehicle data extraction service of the likelihood of redundant data and may be used to determine the data reduction factor.

As discussed in FIG. 5, in one embodiment, a vehicle of a fleet, may transmit location data to the vehicle data extraction service at which point the vehicle data extraction service may identify the partition in which the vehicle belongs and if a threshold has been met, to send to the vehicles of the fleet in the affected partition a new vehicle scheme containing the data reduction factor. In some embodiments, the vehicles are configured such that the vehicle only sends the location information and/or partition information when the vehicle crosses a partition boundary at a specific resolution. For example, if the vehicle is set to be bound in a lower resolution region such as the lower resolution region identified by identifier 804, a change in vehicle partition from "A1B2C1" to "A1B2C2" will not trigger the data to be sent. However, if the vehicle is set to be bound in a higher resolution such as the higher resolution region identified by identifier 806, crossing of the said boundaries from "A1B2C1" to "A1B2C2" will trigger the vehicle to send the location information to the vehicle data extraction service. In some embodiments, the locations upon which the partitions may be drawn may be determined by various inferences made by the vehicle information extraction service. For example, partition A1B2C6 may furthermore be broken down into further sub-partitions. In some embodiments, other partitions may be generated based on various collected vehicle environment information and may fall within multiple boundaries of a geographic region partition. A partition may not be a parallelogram such as a map grid depicted but may have non-uniform boundaries. For example, partition "A1B2C7" 808 may have non-uniform boundary spanning across multipole geographic partitions. In some embodiments, the partitions may be based on vehicle environment factors such as vehicles traveling in certain directions or traveling in certain physical environment such as a bridge. Partitions "A1B2C8" and "A1B2C9" depict partitions that span two different bridges.

In other embodiments, other systems of geocoding for a map partition may be used that are not dependent on gridded partitions, such as the use of Zone Improvement Plan (ZIP) codes or extended ZIP+4 codes to identify partition boundaries or other proximate area approach which would reduce operation cost of utilizing precise GPS information instead of a partition.

Figure 9:
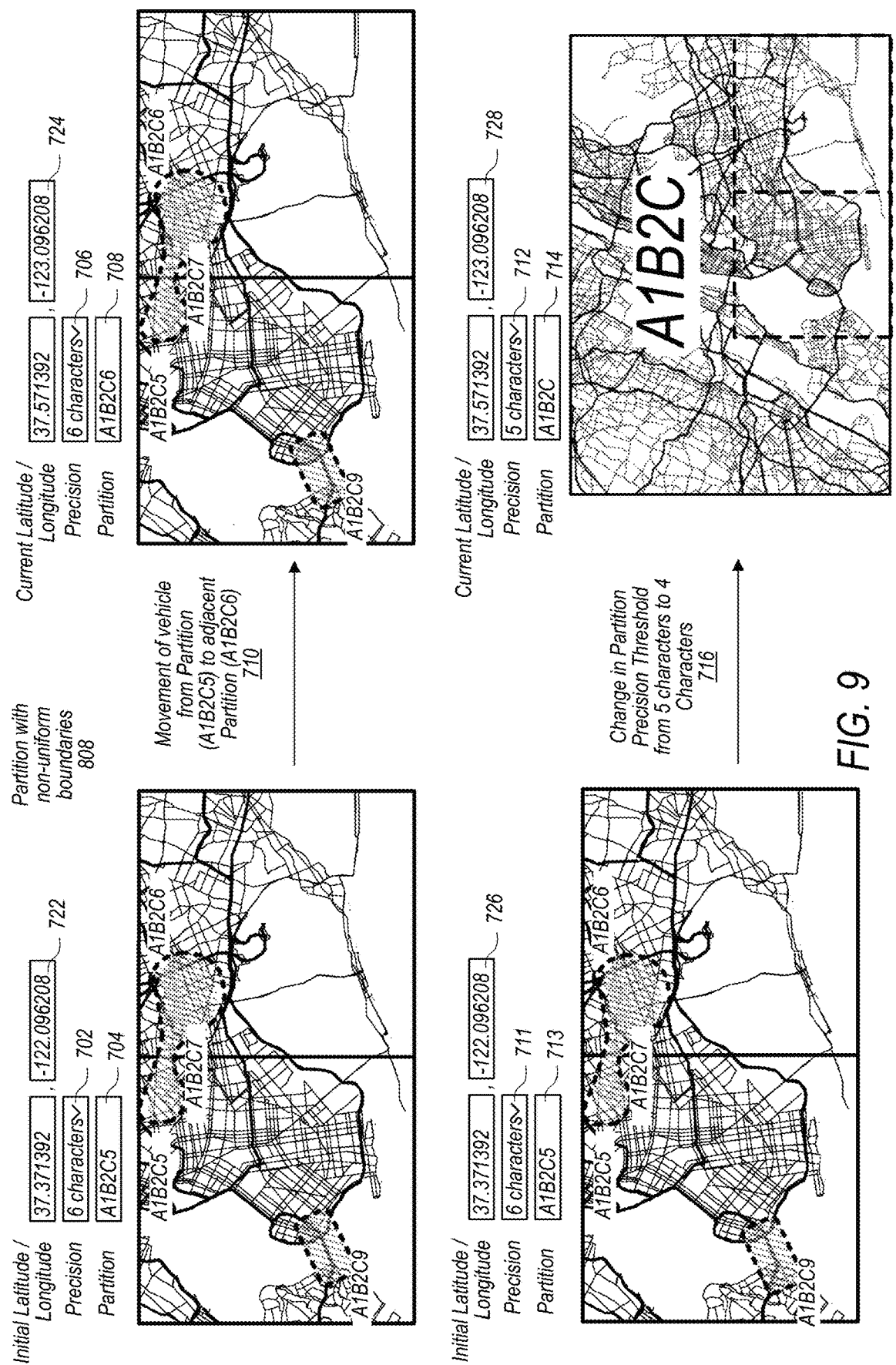
FIG. 9 illustrates effects of changing a resolution of an example map of a vehicle data extraction service that divides the map into gridded regions to define boundaries of a region, according to some embodiments.

FIG. 9 illustrates effects of changing a resolution of an example map of a vehicle data extraction service that divides the map into gridded partitions to define boundaries of a partition, according to some embodiments.

FIG. 9 depicts geographic maps that are each divided into partitions, wherein a precision is set by the vehicle data extraction service and determines the partition boundaries that serve as a trigger for the vehicle to send location data to the vehicle extraction service. For example, upon movement of a vehicle from partition "A1B2C5" 704 to adjacent partition "A1B2C6" 710 if the precision of the partition of the vehicle was set to 6 characters 702 with the vehicle initially located in partition "A1B2C5" 704, detection of movement outside of the smaller partition would trigger the location to be sent. Detection of a change in the initial Latitude/Longitude of the vehicle 722 to current Latitude/Longitude of the vehicle 724 would trigger the vehicle to send the location information to the vehicle data extraction service. In other embodiments, a vehicle in partition "A1B2C5" may transition to a non-uniform partition "A1B2C7" based on changes in various vehicle status such as entering an underpass, entering within certain proximity of an identified object, detection of a vehicle accident, etc.

In some embodiments, the precision in which the partition boundaries are determined may be modified. For example, the initial precision may be 6 characters 711 and correlate to the partition "A21B2C5", such that the partition identifier is characterized by an identifier having 6 characters. When there is a change in a partition precision threshold from 6 characters to 5 characters 712 the current partition 714 "A1B2C" associated with the location of the vehicle would be identified by the same precision. In some embodiments, the precision of partitions of vehicles used may differ based on various factors such as vehicle identity, fleet, sensor data type, etc. and may not all use uniform precision at which to trigger sending the location data to the vehicle data extraction service. Transition into a different precision may result in certain partitions of higher resolutions such as partitions "A1B2C7" and "A1B2C9" not being considered.

Figure 10:
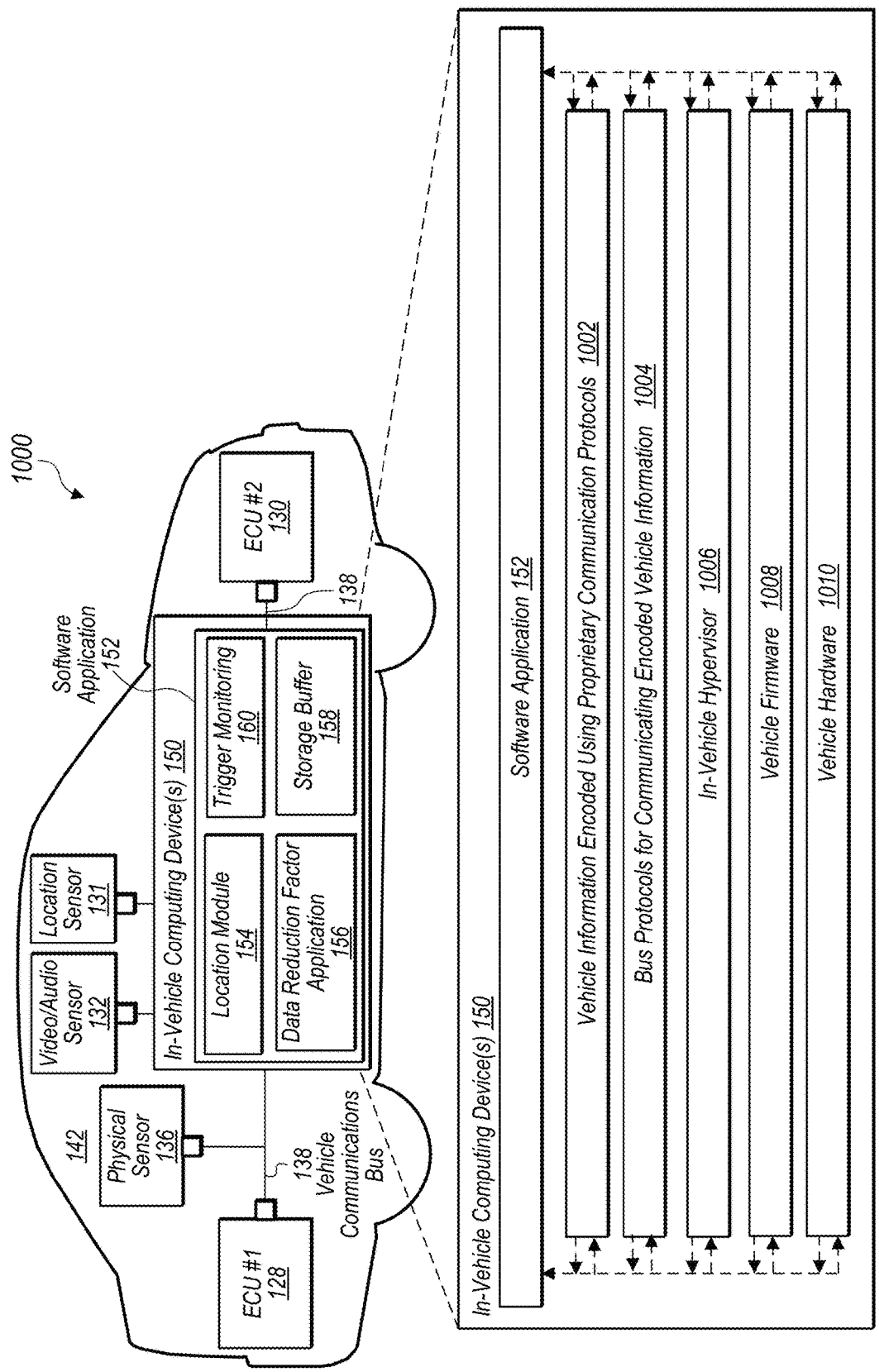
FIG. 10 illustrates a more detailed view of in-vehicle communication configurations of an example network stack of protocols used at different levels to communicate vehicle information over a bus of a vehicle, according to some embodiments.

FIG. 10 illustrates a more detailed view of a network stack of protocols used at different levels to communicate vehicle information over a bus of a vehicle, according to some embodiments.

In some embodiments, a software application 152 may include multiple layers of a network stack of the vehicle that enable access to, and decoding of, the communications transmitted over the communication bus of the vehicle. For example, binary files included in binary file storage of the in-vehicle computing device may indicate access credentials, protocols, and/or addresses used at vehicle hardware layer 1010. Additionally, the binary files may indicate access credentials, protocols, or ports used at a vehicle firmware layer 1008 and/or at an in-vehicle hypervisor layer 1006. Additionally, the binary files may indicate bus protocols used at a bus layer 1004 and proprietary protocols and access credentials of the customer used at layer 1002. Vehicle information monitoring and extraction software application 152 may use these definitions and access credentials included in the binary files to access and decode messages sent over encoded vehicle communications bus 1108. In order to send the raw data, the software application 152 may be provisioned with vehicle identity certificate from a vehicle identity registry from a control plane of a vehicle information extraction service. The software application 152, may decode the communication transmitted over the communication bus using rules for decoding as stated in the decoder rule. In some embodiments, decoder rules differ between vehicles of differing models and/or vehicles of differing OEMs.

Figure 11:
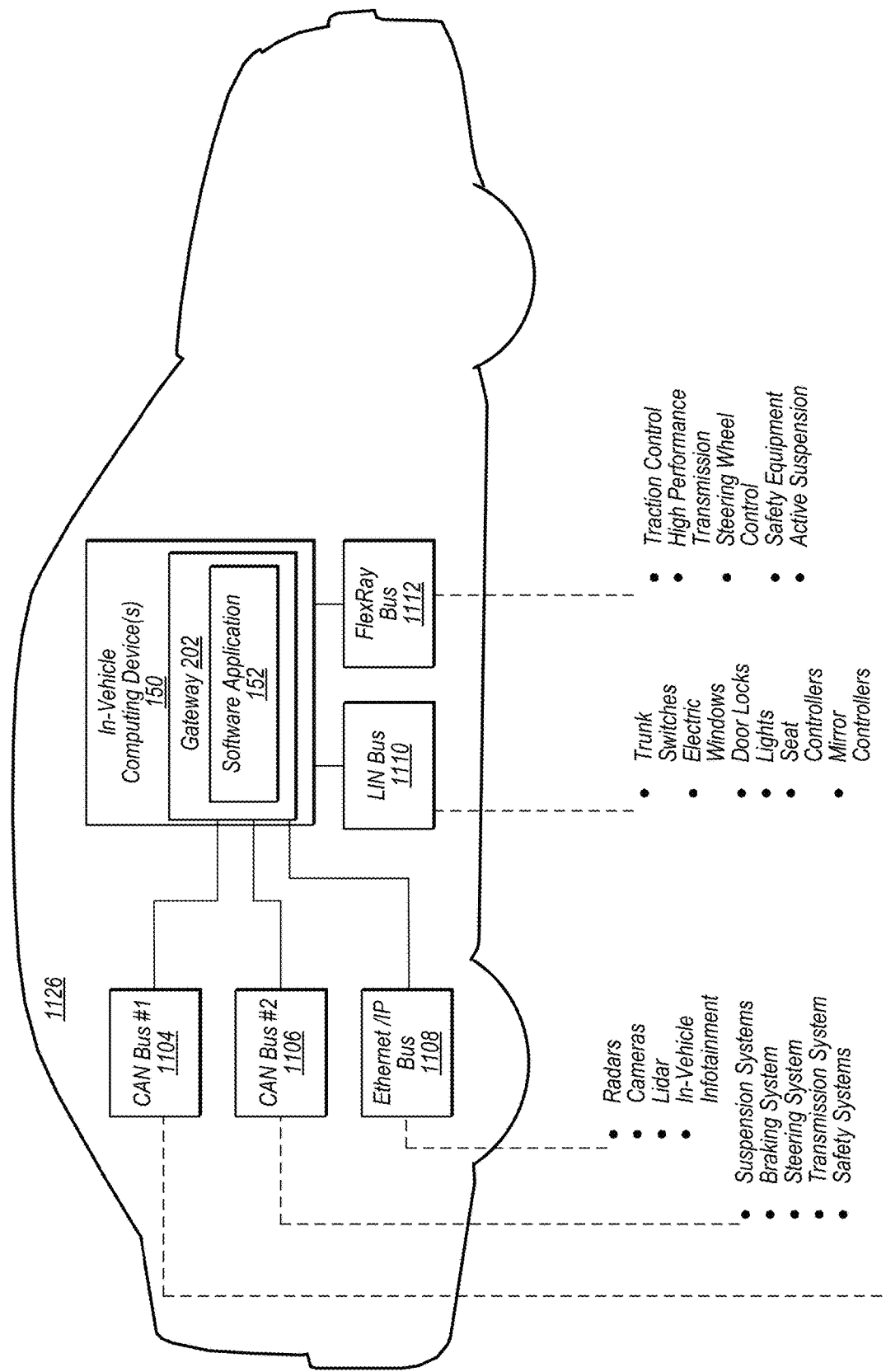
FIG. 11 illustrates an example vehicle comprising multiple different buses that may be monitored for data extraction by a software application deployed by a vehicle information extraction service, according to some embodiments.

FIG. 11 illustrates an example vehicle comprising multiple different buses that may be monitored for data extraction by a software application deployed by a vehicle information extraction service, according to some embodiments.

In some embodiments, a vehicle, such as vehicle 1126, may include multiple buses connected to a gateway 202. For example, vehicle 1126 includes gateway 202 that is connected to CAN bus #1 (1104), CAN bus #2 (1106), Ethernet/IP bus 1108, local interconnect (LIN) bus 1110, and FlexRay bus 1112. As shown in FIG. 11, different types of vehicle information may be transmitted over the different types of buses. In some embodiments, the software application 152 may provide decoder rules or a decoder configuration to decode the various vehicle attributes from the vehicle module configuration into respective in-vehicle communication signals. For example, decoder rules that may be used to decode raw vehicle data from various CAN buses, Ethernet/IP bus, LIN, etc. into physical signals such as engine speed, radar amplitude, etc. that may be sent to the vehicle data extraction service.

Figure 12:
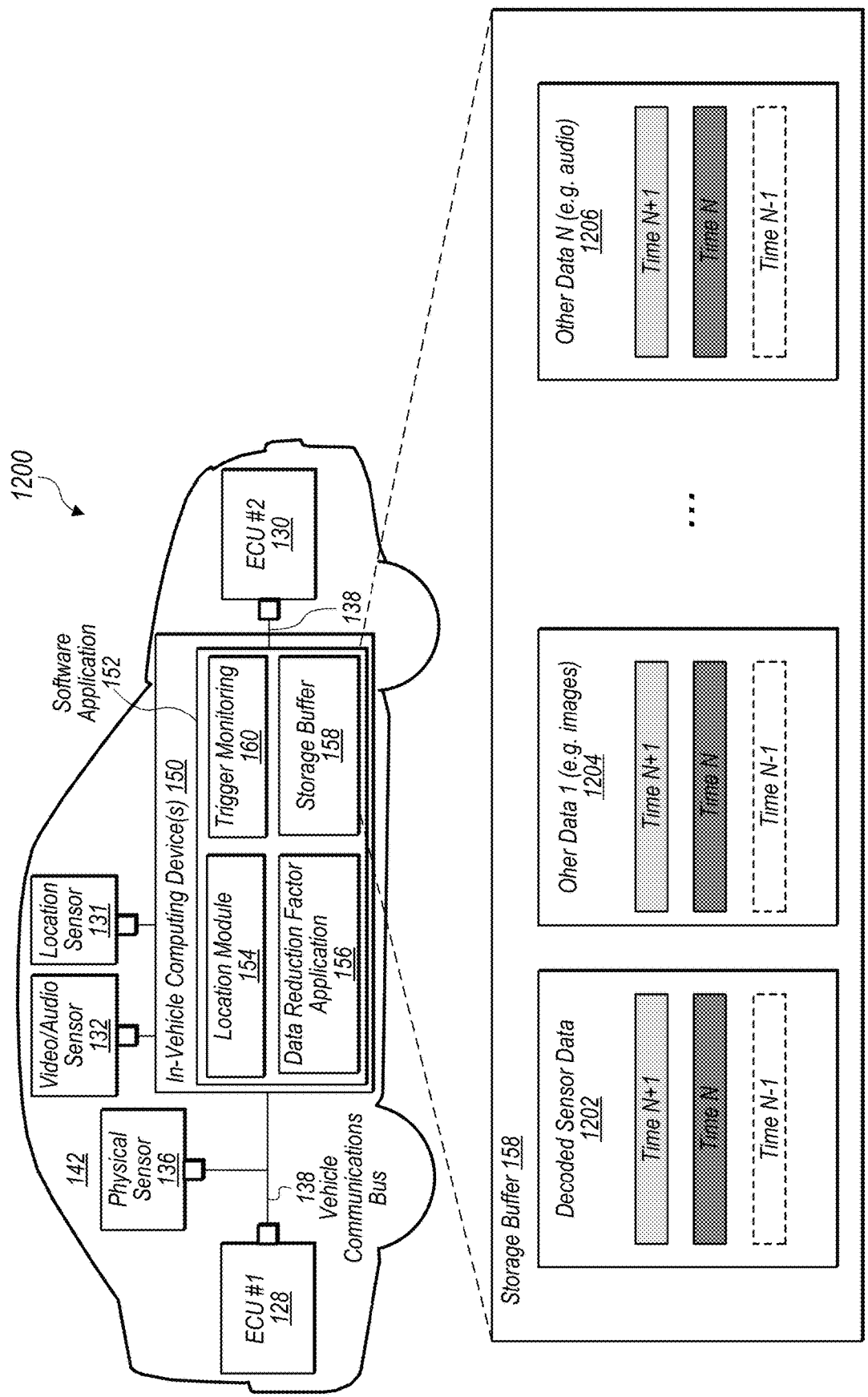
FIG. 12 illustrates a more detailed view of a storage buffer that may be used by an application deployed by a vehicle information extraction service, wherein the storage buffer applies a data reduction factor and stores data from one or more preceding moments in time that is eligible for extraction if one or more triggering criteria are met, according to some embodiments.

FIG. 12 illustrates a more detailed view of a storage buffer that may be used by an application deployed by a vehicle information extraction service, wherein the storage buffer applies a data reduction factor and stores data from one or more preceding moments in time that is eligible for extraction if one or more triggering criteria are met, according to some embodiments.

As shown in FIG. 12, in some embodiments, a storage buffer 158 may store more than one type of data in more than one buffer. For example, storage buffer 158 includes time-synchronized decoded sensor buffer 1202, other data buffer 1 (1204) and other data buffer N (1206). Current data may be stored at time N. Data for a next moment in time will be stored at time N−1, which when the next moment in time arrives will then become time N and the data previously stored at time N, will become time N+1. In some embodiments, a storage buffer 158 may store data for any number of moments of time (e.g., N+X, where X is a number of moments in time that are buffered). Also in some embodiments, X may be different for different types of vehicle information, such that some types of vehicle information are buffered for longer periods of times than other types of vehicle information.

In some embodiments, a global time stamp may be applied to the vehicle information when stored in the storage buffer 1202. Also, in some embodiments the payload of data stored in storage buffer 1202 may include time stamps associated with the stored data that were generated by other components of the vehicle, such as a time stamp of when a message comprising the data was submitted to the encoded vehicle communications bus 138, or a time when the data was sensed, such as by physical sensor 136. Thus, in some embodiments, a piece of data may have more than one time stamp associated with it, such as a payload time stamp for when the data was sensed, for example at physical sensor 136, another payload time stamp for when the data was submitted to encoded vehicle communications bus 138, and another time stamp for when the data was received at storage buffer 158. In some embodiments, a piece of data stored in storage buffer 158 may be stored with more or fewer time stamps. Such time stamps may enable an accurate format of a sequence of events in the vehicle to be recreated, for example by the software application 152, or by an extracted data analysis and visualization module 114 of a vehicle information extraction service 102. In some embodiments, the data reduction factor application 156 may select and filter out data after the data has been stored in the storage buffer 158. For example, the data reduction factor application 156 may apply a data reduction factor and determine that the percentage of temperature data that is filtered is 50% and remove approximately half of the data that is stored in the buffer within a certain time frame with that data reduction factor. In other embodiments, the filtering of the data would occur prior to the data being stored in the buffer wherein in the example of the temperature data, 50% of the sensor data would not be stored. In other embodiments, all of the data would be stored in the storage buffer, but the filtering would occur only in the transmission of this data to the vehicle data extraction service wherein only half of the data would be sent.

Figure 13:
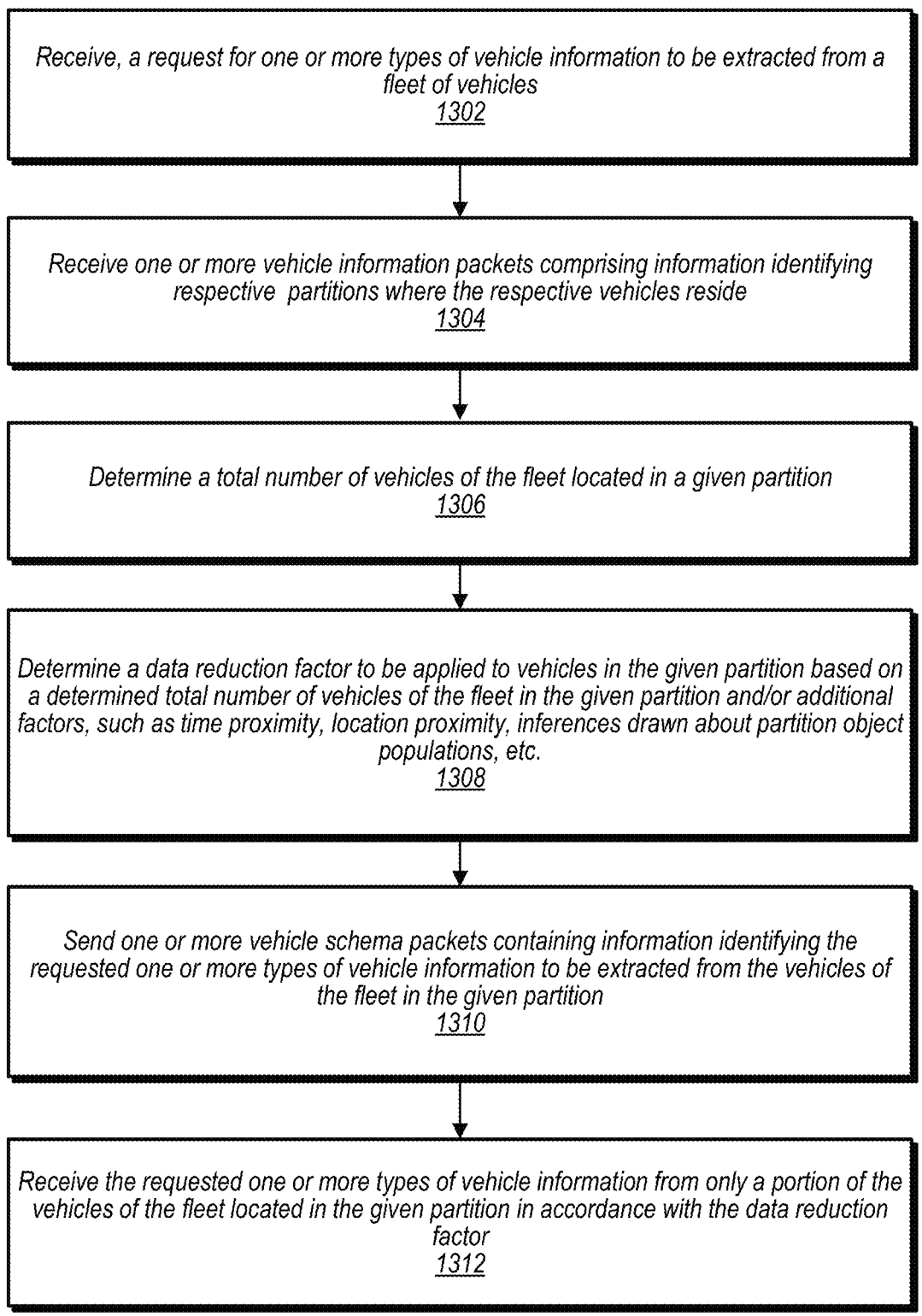
FIG. 13 illustrates a flowchart of operations performed by a vehicle information extraction service to apply data reduction for amounts of information to be extracted from vehicles of a fleet based on partition criteria and a number of vehicles of the fleet in the partition, amongst other factors, according to some embodiments.

FIG. 13 illustrates a flowchart of operations performed by a vehicle information extraction service that optimizes amount of information to be extracted from vehicles based on a partition criterion and a number of vehicles of a fleet of vehicles in the partition, amongst other factors, according to some embodiments.

At block 1302, a vehicle information extraction service receives from a customer of the vehicle information extraction service, a request for one or more types of vehicle information to be extracted from a fleet of vehicles.

At block 1304, a vehicle information extraction service receives one or more vehicle information packets provided by respective vehicles of the fleet, wherein respective ones of the one or more vehicle information packets comprise information used to identify respective partitions.

At block 1306, a vehicle information extraction service determines a total number of vehicles of the fleet located in respective ones of the partitions.

At block 1308, a vehicle information extraction service determines one or more data reduction factors to be applied to vehicles in the respective ones of the partitions based on the respective total numbers of vehicles in the respective ones of the partitions, wherein the one or more data reduction factors comprise a probability that a given vehicle of the fleet in a given respective partition will have non-redundant vehicle information as compared to other ones of the vehicles of the fleet in the given respective partition.

At block 1310, a vehicle information extraction service sends one or more vehicle schema packets to the vehicles of the fleet in the respective one or more partitions. In some embodiments, the vehicle schema packets may contain information identifying the requested one or more types of vehicle information to be extracted and a corresponding data reduction factor to be applied.

At block 1312, a vehicle information extraction service receives the requested one or more types of vehicle information from only a portion of the vehicles of the fleet located in a given partition in accordance with the data reduction factor.

Figure 14:
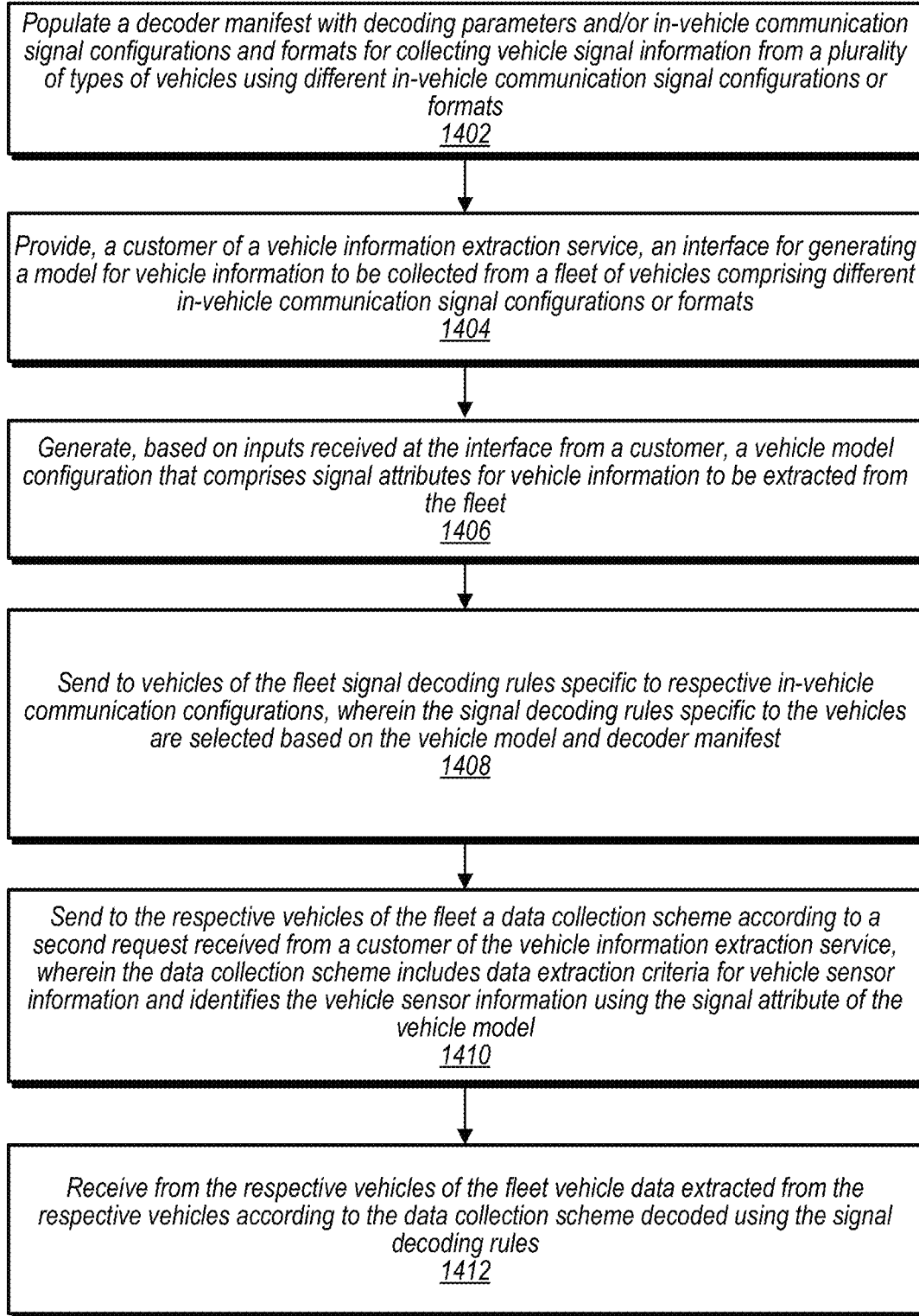
FIG. 14 illustrates a flowchart for implementing a modelling system in a vehicle information extraction service that allows a unified model to be generated for a fleet of vehicles and that automatically accounts for variations in in-vehicle communications configurations to allow requested information specified in the model to be collected from a heterogenous fleet of vehicles, according to some embodiments.

FIG. 14 illustrates a flowchart for implementing a modelling system in a vehicle information extraction service that allows a unified model to be generated for a fleet of vehicles and that automatically accounts for variations in in-vehicle communications configurations to allow requested information specified in the model to be collected from a heterogenous fleet of vehicles, according to some embodiments.

At block 1402, a vehicle information extraction service populates a decoder manifest with decoding parameters and/or in-vehicle communication signal configurations and formats for collecting vehicle signal information from a plurality of types of vehicles using different in-vehicle communication signal configurations or formats. The decoding parameters and/or in-vehicle communication signal configuration and formats may be revied by the vehicle information extraction service from vehicle OEMs, tier-1 suppliers, or other parts suppliers. In some embodiments, OEMs that are customers of the vehicle information extraction service may provide such information as part of onboarding with the vehicle extraction service. In some embodiments, such information may be stored by the vehicle information extraction service, such that customers of the vehicle information extraction service cannot access the details of the decoding parameters and/or in-vehicle communication signal configurations and formats.

At block 1404, the vehicle information extraction service provides an interface for generating a model for vehicle information to be collected from a fleet of vehicles comprising different in-vehicle communication signal configurations or formats. For example, a customer of the vehicle information extraction service may use the interface to specify a model for data collection from a fleet of vehicles having different in-vehicle communication configurations.

At block 1406, the vehicle information extraction service generates, based on inputs received at the interface from a customer, a vehicle model configuration that comprises signal attributes for vehicle information to be extracted from the fleet.

At block 1408, the vehicle information extraction service sends to vehicles of the fleet signal decoding rules specific to respective in-vehicle communication configurations, wherein the signal decoding rules specific to the vehicles are selected based on the vehicle model and decoder manifest.

At block 1410, the vehicle information extraction service sends to the respective vehicles of the fleet a data collection scheme according to a second request received from a customer of the vehicle information extraction service, wherein the data collection scheme includes data extraction criteria for vehicle sensor information and identifies the vehicle sensor information using the signal attribute of the vehicle model.

At block 1412, the vehicle information extraction service receives from the respective vehicles of the fleet vehicle data extracted from the respective vehicles according to the data collection scheme decoded using the signal decoding rules.

While not specifically shown in FIG. 14, in some embodiments, a vehicle information extraction service may further apply data reduction factors when collecting the requested vehicle information from the fleet, such as described with regard to FIG. 13.

Example Computer System

Figure 15:
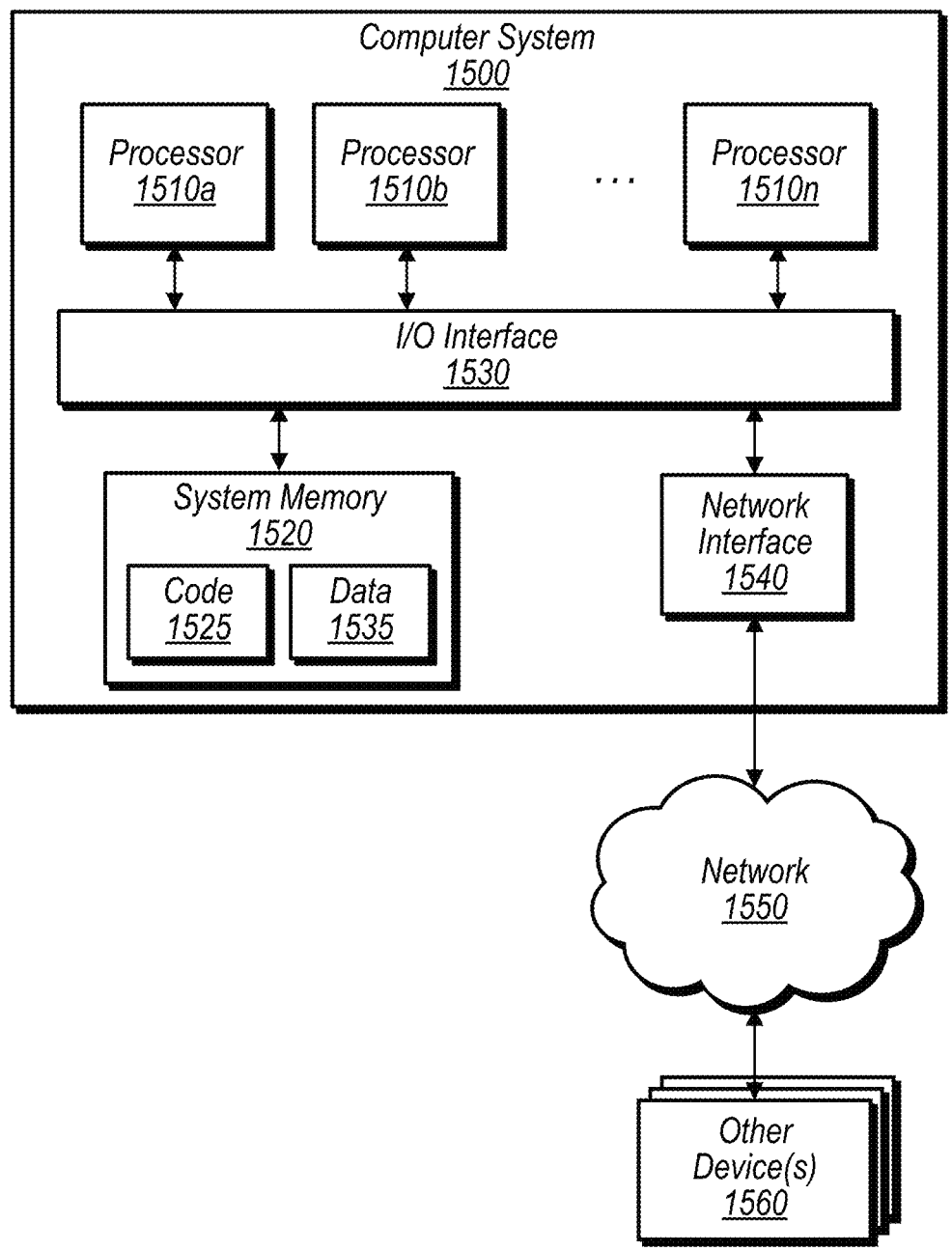
FIG. 15 illustrates a block diagram illustrating an example computer system that implements some or all of the techniques described herein, according to some embodiments.

Any of various computer systems may be configured to implement processes associated with a vehicle information extraction service, a software application/packaged deployed to a vehicle from a vehicle information extraction service, a provider network that implements a vehicle extraction service, an operating system in a vehicle or device, or any other component of the above figures. For example, FIG. 15 illustrates a block diagram illustrating an example computer system that implements some or all of the techniques described herein, according to some embodiments. In various embodiments, the vehicle information extraction service, deployed software package, the provider network that implement the vehicle information extraction service and other cloud services, the operating system in a vehicle or device, or any other component of the above figures FIGS. 1-14 may each include one or more computer systems 1500 such as that illustrated in FIG. 15.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530. In some embodiments, computer system 1500 may be illustrative of servers implementing enterprise logic or downloadable application, while in other embodiments servers may include more, fewer, or different elements than computer system 1500.

In various embodiments, computing device 1500 may be a uniprocessor system including one processor or a multiprocessor system including several processors 1510A-1510N (e.g., two, four, eight, or another suitable number). Processors 1510A-1510N may include any suitable processors capable of executing instructions. For example, in various embodiments, processors 1510A-1510N may be processors implementing any of a variety of instruction set formats (ISAs), such as the x86, PowerPC, SPARC, or MIPS ISAs, or any other suitable ISA. In some embodiments, processors 1510A-1510N may include specialized processors such as graphics processing units (GPUs), application specific integrated circuits (ASICs), etc. In multiprocessor systems, each of processors 1510A-1510N may commonly, but not necessarily, implement the same ISA.

System memory 1520 may be configured to store program instructions and data accessible by processor(s) 1510A-1510N. In various embodiments, system memory 1520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1520 as code (i.e., program instructions) 1525 and data 1535.

In one embodiment, I/O interface 1530 may be configured to coordinate I/O traffic between processors 1510A-1510N, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, I/O interface 1530 may include support for devices attached via an automotive CAN bus, etc. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processors 1510A-1510N.

Network interface 1540 may be configured to allow data to be exchanged between computing device 1500 and other devices 1560 associated with a network or networks 1550. In various embodiments, network interface 1540 may support communication via any suitable wired or wireless general data networks, such as types of Ethernet networks, cellular networks, Bluetooth networks, Wi-Fi networks, Ultra-wideband Networks, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1500 via I/O interface 1530. One or more non-transitory computer-readable storage media may also include any volatile or non-volatile media such as RAM (e.g., SDRAM, DDR SDRAM, RDRAM, SRAM, etc.), ROM, etc., that may be included in some embodiments of computing device 1500 as system memory 1520 or another type of memory. Further, a computer-readable medium may include transmission media or signals such as electrical, electromagnetic, or digital signals, conveyed via a communication medium such as a network and/or a wireless link, such as may be implemented via network interface 1540. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system for implementing a vehicle information extraction service, comprising:
one or more computing devices configured to:
generate, according to a first request received from a customer of the vehicle information extraction service, a vehicle model that organizes a subset of signal attributes of a plurality of signal attributes for a plurality of vehicles of a fleet, wherein at least a portion of the plurality of vehicles of the fleet use heterogeneous vehicle signal formats for a same signal attribute of the subset;
send to the plurality of vehicles of the fleet respective signal decoding rules, of a plurality of signal decoding rules, for decoding signal attributes for the plurality of vehicles that have the signal attributes included in the vehicle model, wherein the sent signal decoding rules enable decoding of in-vehicle communication signals;
send to the respective vehicles of the fleet a data collection scheme according to a second request received from a customer of the vehicle information extraction service, wherein the data collection scheme includes data extraction criteria for vehicle sensor information and the second request received from the customer identifies the vehicle sensor information using the subset of signal attributes of the vehicle model; and
receive, from the respective vehicles of the fleet, vehicle data extracted from the respective vehicles according to the data collection scheme, wherein the vehicle data extracted from the respective vehicles has been decoded at the respective vehicles using the sent signal decoding rules.

2. The system of claim 1, wherein the fleet comprises vehicles having different in-vehicle communication signal configurations, and wherein sending to the plurality of vehicles of the fleet respective signal decoding rules is based on which of the different in-vehicle communication signal configurations respective ones of the vehicles use.

3. The system of claim 1, wherein the one or more computing devices are further configured to:
receive information describing the signal attributes of respective ones of a plurality of sensors from manufacturers or suppliers for the plurality of vehicles wherein the plurality of vehicles comprises vehicles having different in-vehicle communication signal configurations; and
generate a signal catalog that organizes the signal attributes into a unified signal representation, and wherein a signal configuration of the vehicle model is based on the signal catalog.

4. The system of claim 3, wherein the signal configuration of the vehicle model omits signals for which there are no decoding rules in the signal catalog for mapping vehicle specific signal names used by the manufacturers or the suppliers to the respective signal attributes of the signal catalog.

5. The system of claim 4, wherein the one or more computing devices are further configured to:
receive, from a manufacturer or a supplier, a plurality of sensor specific signal decoding rules for decoding signals corresponding to the signal attributes of the signal catalog corresponding to respective ones of a plurality of signal attribute names, wherein the sensor specific signal decoding rules enable decoding of signals formatted according to respective in-vehicle communication signal formats of the vehicles of the fleet.

6. A method, comprising:
generating a vehicle model that organizes a subset of signal attributes of a plurality of signal attributes for a plurality of vehicles of a fleet, wherein at least a portion of the plurality of vehicles of the fleet use heterogeneous vehicle signal formats for a same signal attribute of the subset;
sending to the plurality of vehicles of the fleet respective signal decoding rules, of a plurality of signal decoding rules, for decoding signal attributes for the plurality of vehicles that have the signal attributes included in the vehicle model, wherein the sent signal decoding rules enable decoding of in-vehicle communication signals;
sending to the respective vehicles of the fleet a data collection scheme, wherein the data collection scheme includes data extraction criteria for vehicle sensor information; and
receiving, from the respective vehicles of the fleet, vehicle data extracted from the respective vehicles according to the data collection scheme, wherein the vehicle data extracted from the respective vehicles has been decoded at the respective vehicles using the sent signal decoding rules.

7. The method of claim 6, wherein the fleet comprises vehicles having different in-vehicle communication signal configurations, and wherein sending to the plurality of vehicles of the fleet respective signal decoding rules is based on which of the different in-vehicle communication signal configurations respective ones of the vehicles use.

8. The method of claim 6, further comprising:
receiving information describing the signal attributes of respective ones of a plurality of sensors from manufacturers or suppliers of the plurality of vehicles wherein the plurality of vehicles comprises vehicles having different in-vehicle communication signal configurations; and
generating a signal catalog that organizes the signal attributes into a unified signal representation, and wherein a signal configuration of the vehicle model is based on the signal catalog.

9. The method of claim 8, wherein the signal configuration of the vehicle model omits signals for which there are no decoding rules in the signal catalog for mapping vehicle specific signal names used by the manufacturers or the suppliers to the respective signal attributes of the signal catalog.

10. The method of claim 9, further comprising:
receiving, from a vehicle manufacturer or a supplier, a plurality of sensor specific signal decoding rules for decoding signals corresponding to the signal attributes of the signal catalog corresponding to respective ones of a plurality of signal attribute names, wherein the sensor specific signal decoding rules enable decoding of signals formatted according to respective in-vehicle communication signal formats of the vehicles of the fleet.

11. The method of claim 6, further comprising:
decoding the vehicle data extracted from the respective vehicles using the signal decoding rules, wherein the vehicle data received is decoded from binary format into sensor signal values.

12. The method of claim 11, further comprising:
associating the sensor signal values with one or more vehicle attributes of the vehicle from which the vehicle data is extracted; and
publishing the sensor signal values to a time-series database.

13. The method of claim 6, wherein the vehicle sensor information comprises one or more of:
camera data;
LiDar data;
electronic control unit (ECU) data; or
location sensor data.

14. The method of claim 6, wherein the signal attributes comprise static properties associated with a particular vehicle including: a unique vehicle ID, vehicle brand, vehicle body type, and vehicle engine model.

15. The method of claim 6, wherein the data collection scheme further includes information identifying the vehicle sensor information to be extracted corresponding to a data reduction factor, wherein the data reduction factor is based on a total number of vehicles of a collection of vehicles in a given geographic region and based on an inference of vehicle environment of the collection of vehicles, wherein the extracted vehicle data is only extracted from a portion of the collection of vehicles.

16. One or more non-transitory, computer-readable storage media, storing program instructions that when executed on or across one or more processors cause the one or more processors to implement a vehicle information extraction service that implements:
generating a vehicle model that organizes a subset of signal attributes, of a plurality of signal attributes, for a plurality of vehicles of a fleet, wherein at least a portion of the plurality of vehicles of the fleet use heterogeneous vehicle signal formats for a same signal attribute of the subset;
sending to the plurality of vehicles of the fleet respective signal decoding rules, of a plurality of signal decoding rules, for decoding signal attributes for the plurality of vehicles that have the signal attributes included in the vehicle model, wherein the sent signal decoding rules enable decoding of in-vehicle communication signals;
sending to the respective vehicles of the fleet a data collection scheme, wherein the data collection scheme includes data extraction criteria for vehicle sensor information; and
receiving, from the respective vehicles of the fleet, vehicle data extracted from the respective vehicles according to the data collection scheme, wherein the vehicle data extracted from the respective vehicles has been decoded at the respective vehicles using the sent signal decoding rules.

17. The one or more non-transitory computer-readable storage media of claim 16, wherein the instructions, when executed on or across the one or more processors, further cause the vehicle information extraction service to implement:
decoding the vehicle data extracted from the respective vehicles of the fleet using the signal decoding rules, wherein the vehicle data received is decoded from an in-vehicle format into sensor signal values.

18. The one or more non-transitory computer-readable storage media of claim 17, wherein the instructions, when executed on or across the one or more processors, further cause the vehicle information extraction service to implement:
associating a given sensor signal value with one or more vehicle attributes of the vehicle from which the vehicle data is extracted; and
publishing the sensor signal value to a time-series database.

19. The one or more non-transitory computer-readable storage media of claim 16, wherein the vehicle sensor information comprises one or more of:
camera data;
LiDar data;
electronic control unit (ECU) data; or
location sensor data.

20. The one or more non-transitory computer-readable storage media of claim 16, wherein the signal attributes comprise static properties associated with a particular vehicle including: a unique vehicle ID, vehicle brand, vehicle body type, or vehicle engine model.

* * * * *